(12) United States Patent
Jardiniano

(10) Patent No.: US 11,511,837 B2
(45) Date of Patent: Nov. 29, 2022

(54) HYBRID PROPULSOR FOR WATERCRAFT

(71) Applicant: Marangal Mendoza Jardiniano, Lake Elsinore, CA (US)

(72) Inventor: Marangal Mendoza Jardiniano, Lake Elsinore, CA (US)

( * ) Notice: Subject to any disclaimer, the term of this patent is extended or adjusted under 35 U.S.C. 154(b) by 0 days.

(21) Appl. No.: 16/913,866

(22) Filed: Jun. 26, 2020

(65) Prior Publication Data
US 2021/0354801 A1 Nov. 18, 2021

Related U.S. Application Data

(60) Provisional application No. 62/870,989, filed on Jul. 5, 2019.

(51) Int. Cl.
| | |
|---|---|
| B63H 3/00 | (2006.01) |
| B63H 1/16 | (2006.01) |
| B63H 1/22 | (2006.01) |
| B63H 1/28 | (2006.01) |
| B63H 11/08 | (2006.01) |
| B63H 1/14 | (2006.01) |

(52) U.S. Cl.
CPC ............... B63H 3/008 (2013.01); B63H 1/16 (2013.01); B63H 1/22 (2013.01); *B63H 11/08* (2013.01); *B63H 2001/145* (2013.01); *B63H 2001/283* (2013.01); *B63H 2001/286* (2013.01); *B63H 2011/081* (2013.01)

(58) Field of Classification Search
CPC ...... B63H 2001/145; B63H 1/16; B63H 1/22; B63H 1/24; B63H 1/26; B63H 2001/286; B63H 3/008
See application file for complete search history.

(56) References Cited

U.S. PATENT DOCUMENTS

| | | | |
|---|---|---|---|
| 1,556,012 A | | 10/1925 | Flettner |
| 3,095,043 A | * | 6/1963 | Heintzelman ............ B63H 1/26 |
| | | | 416/88 |
| 3,598,080 A | | 8/1971 | Shields |
| 4,424,042 A | | 1/1984 | Gongwer |
| 4,897,995 A | | 2/1990 | Guirguis |

(Continued)

FOREIGN PATENT DOCUMENTS

| | | |
|---|---|---|
| AU | 2003223907 B2 | 12/2003 |
| EP | 0025290 B1 | 3/1981 |

*Primary Examiner* — Andrew Polay
(74) *Attorney, Agent, or Firm* — Robert McConnell; McConnell Law Firm P.C.

(57) ABSTRACT

A novel watercraft propulsion device is disclosed that includes multiple propulsive elements improving power and efficiency over prior designs. A self-adjusting variable pitch propeller is combined with a water jet and an exhaust driven turbine to provide optimal thrust and efficiency across the range of engine power, load and watercraft speed. In the preferred embodiment, propulsive elements are axially disposed around a central drive shaft and exhaust port with the combined water jet/exhaust turbine disposed closest to drive shaft and the variable pitch propeller attached to the exterior of the water jet housing. A rotating duct is fixed to the propeller blades and rotates with the blades to reduce cavitation. Combined apparatus provides increased performance and efficiency over all watercraft speeds/load as well as additional safety due to the ducted propeller.

18 Claims, 35 Drawing Sheets

(56) References Cited

U.S. PATENT DOCUMENTS

| | | | |
|---|---|---|---|
| 4,931,026 A * | 6/1990 | Woodland | B63H 5/10 |
| | | | 60/221 |
| 4,979,917 A | 12/1990 | Haynes | |
| 5,549,455 A | 8/1996 | Speer | |
| 5,851,131 A | 12/1998 | Bergeron | |
| 6,725,797 B2 | 4/2004 | Hilleman | |
| 72,412,193 | 7/2007 | Jordan | |
| 7,341,496 B2 | 3/2008 | Rzadki et al. | |

* cited by examiner

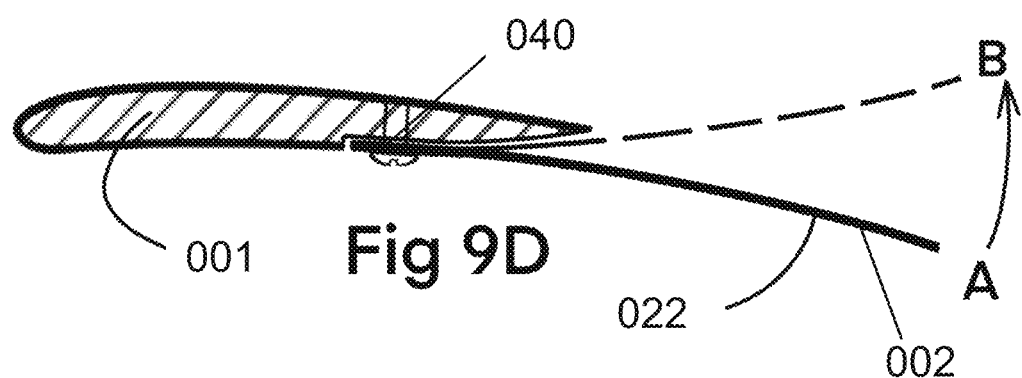
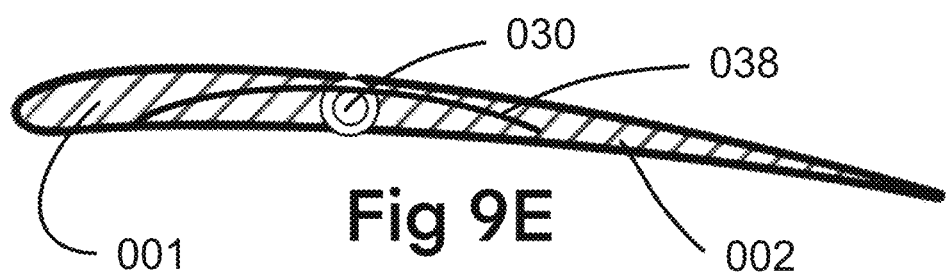
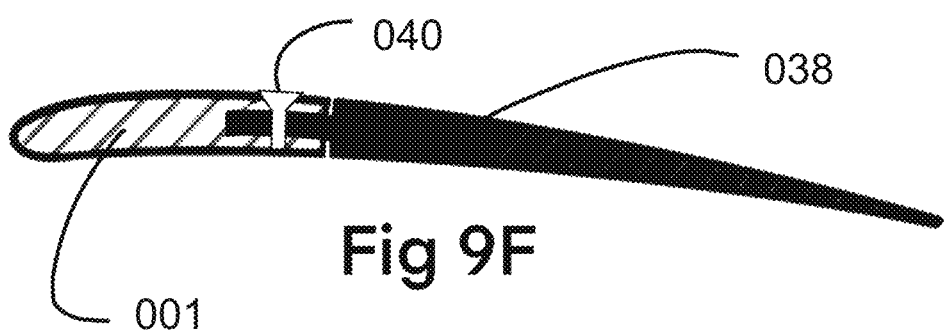

HYBRID PROPULSOR FOR WATERCRAFT

BACKGROUND OF THE INVENTION

Field of the Invention

The present invention relates to watercraft propulsion systems and a novel combination of propulsive elements that improve overall performance and efficiency. The invention combines a self-adjusting variable pitch propeller, a water jet, an exhaust driven turbine and a rotating duct fixed to the propeller blades. This combination provides improved low speed acceleration/"HOLE SHOT" performance with increased top speed, reduced cavitation and improved efficiency.

Description of Background Art

Propellers, drive motors and propeller control systems are well documented in the art. Traditionally, a propeller consists of a hub with a number of fixed blades or wings disposed around a hub. The hub is attached to a drive shaft that's driven by an engine. When the engine turns it rotates the drive shaft which in term rotates the blades or wings. By their design, which includes a pitch, the rotating propeller blades provide forward movement for the watercraft.

In prior embodiments, the propeller can be design similar to a fan, consisting of 2 or more fixed blades spinning around a shaft. The blade rotation creates dynamics similar to a rotating screw or airfoil, a pressure difference between forward and rear surfaces of the blades is produced and accelerates the water behind the blade to create propulsive force.

Propellers with fixed blades are well known in the art as fixed pitch propellers. Variable pitch propellers are also well known with blades that rotate on the hub. Other forms of propellers known in the art include progressive pitch propellers and ducted propellers. A ducted propeller spins inside a fixed duct.

The design tradeoffs of the various propeller types are significant and well documented.

Fixed pitch propellers have blade pitch that is fixed to optimize for a particular task, i.e. acceleration from a stop or top speed, and cannot be adjusted easily to accommodate for different performance needs. Fixed blade propellers are limited to the pitch chosen at build and can only be changed by switching the entire propeller assembly.

Controllable pitch propellers partially solve some of the weaknesses of fixed pitch propellers. However, these designs require significantly increased complexity/cost with gears or other control means within the propeller hub that must be controlled by mechanical, electrical or hydraulic means. These means can improve control for particular load circumstances but do so at significantly increased cost and complexity.

Another weakness of current propeller design is cavitation, turbulence and ventilation which causes propeller slip and drag. A ducted propeller can overcome these problems but not totally eliminate the problem of cavitation since there is a gap between the blades and the propeller tips where most of the cavitation and turbulence occurs.

Another form of watercraft propulsion is the water jet or pump jet. These designs are commonly found in personal watercraft such as wave runners and jet skis as well as certain types of boats. Water jets are designed for speed but not for heavy loads like traditional propeller designs. They have certain safety advantages as well but their fixed pitch design and optimization for speed force boat designers to make choices that favor only certain types of activities.

Another system of watercraft propulsion is the counter-rotating or contra-rotating propellers also known and hereinafter called as CRP system. It is recognized in the art that the forward and the aft propellers of the CRP system interact with each other and generate a much more complicated water flow field around the system compared with that around a single-screw system or a CRP system using identical propeller for the forward and aft. Another weakness of the CRP system is the increased cavitation in between the forward and aft propellers.

The limitations and tradeoffs of the above mentioned propulsion types are well documented in the art. The limited discussion above aims to outline the current major challenges in the art but not to discuss every potential variation of the above designs.

OBJECTS OF THE INVENTION

It is an object of the current invention to provide an improved propeller design that minimizes or eliminates these design choices.

Another object of the invention is to provide a variable pitch propeller with the means to automatically detect varying load conditions and adjust accordingly. By attaching swiveling vanes and/or bending vanes on the trailing edge of each fixed blade similar to ailerons of an airplane wing, the angle of attack or pitch can now be altered, automatically, on-demand and with significantly reduced complexity.

Another object of the invention is to provide an improved ducted propeller. The duct in the present invention is fixed to the outer edge of the propeller blades and spins with the blades, thus cavitation is significantly reduced. Another embodiment presented includes fins at the tip of each blade to reduce cavitation.

A further object of the invention includes a propulsion system including both a propeller and a water jet or pump jet. This combination provides advantages of both types of systems It is another object of the invention to provide an exhaust driven turbine that produces propulsive force based on airflow from the engine exhaust through the turbine. This additional source of propeller force is created using existing heat and pressure from the engine exhaust and thus increases efficiency of the overall system.

Another object of the invention is to simplify the design, use, and application of adjustable pitch propellers both on inboard and outboard motor application by eliminating complex control system and sensors, whether electronic or mechanical, which is usually required on conventional variable automatically adjustable pitch propellers.

It is further object of the invention to minimize interaction between the forward propeller and aft propeller in a CRP system by incorporating elements of the invention. Using an adjustable pitch type as the forward propeller in tandem with a ducted impeller at the aft will prevent complicated flow of water pressure between the forward propeller and aft propeller thus increasing efficiency and reduce fuel consumption.

Another object of the invention is to make a variant of the propulsor for use on inboard motors as they do not have exhaust exit to the propeller like an outboard motor.

SUMMARY OF THE INVENTION

The present invention discloses a novel hybrid propulsion system for watercraft. This hybrid propulsion system includes elements that address the traditional design tradeoffs that occur with propeller and/or pump/water jet systems. Because these tradeoffs are minimized, the system has improved fuel efficiency and performance across all speed ranges.

In the preferred embodiment, the present invention includes a hybrid propeller and water jet drive apparatus. Both the propeller and pump jet are disposed axially around a central drive shaft connected to an engine. The engine can be of any type known in the art including internal combustion, turbine or electric and can be utilized in both for inboard and outboard drive applications. The water jet apparatus is most central to the drive apparatus and the propeller apparatus is connected to the outer housing of the water jet apparatus.

Also disclosed as part of the preferred embodiment is an automatically adjustable variable pitch propeller. This variable pitch propeller is not controlled hydraulically, electrically or mechanically through the hub of the propeller as disclosed in prior art embodiments, but includes vanes, trim tabs or ailerons at the edge of each propeller blade. These vanes, trim tabs or ailerons are loaded by one of: a flat spring, a spring wire, flexible materials, or other device that adjusts the position of the tab based on the hydraulic pressure of the water dependent on speed, load, and acceleration. The tab adjusts automatically to provide the optimal pitch for the circumstances.

The disclosed invention also includes a rotating duct that is fixed to the outer edge of the propeller blade and rotates with the propeller blades. The eliminated space between the propeller and duct reduces cavitation and other turbulence.

It is further disclosed as part of the preferred embodiment are fins attached to the propeller blades in order to minimize cavitation.

Lastly, the preferred embodiment includes an exhaust driven turbine that is powered by the engine exhaust gas. Exhaust gas travels down a pipe parallel or around the drive shaft and is forced through the turbine. The force of the gas pressure on the turbine provides additional rotational force on the propeller and thus additional kinetic energy. This additional energy would otherwise be lost, so this element of the invention also increases efficiency.

BRIEF DESCRIPTION OF THE DRAWINGS

FIGS. 9B-9F, illustrate alternate embodiments of an adjustable vane blade.

DESCRIPTION OF THE PREFERRED EMBODIMENT

Figure 1:
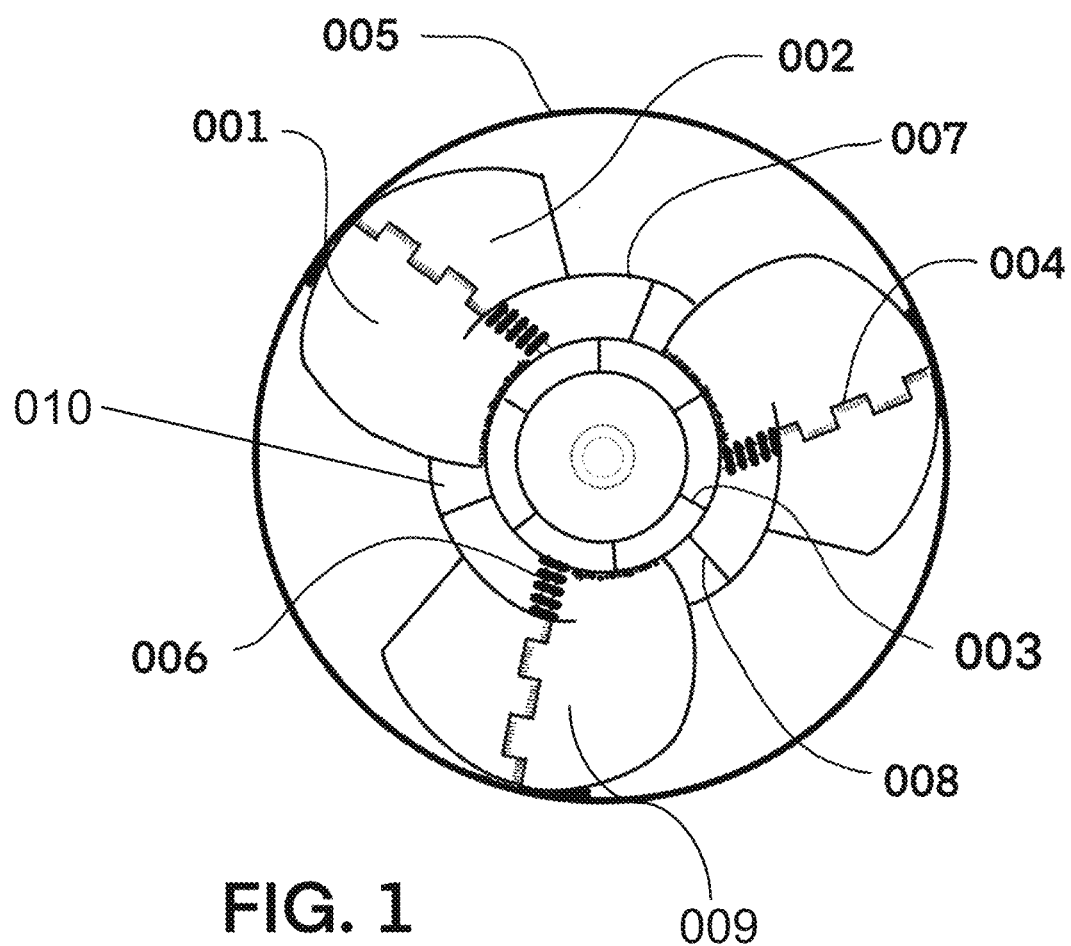
FIG. 1 shows the water inlet side of the propulsor including the propeller with automatically adjustable vanes, water jet assembly attached to the hub, a rotating duct, the spring system which gives tension to the adjustable vanes, and the center hub.

Multiple propulsion systems for watercraft have been well documented in the art. While there are additional types of drive systems, this application and the disclosed invention focuses on two major categories of watercraft propulsive systems: screw propellers and water jets or pump jets. Each of these systems have advantages and disadvantages depending on the watercraft application and performance needs of that application. Some of the disadvantages of these drive systems can include, without limitation, cavitation, ventilation, slip, drag, turbulence, and vortex. Screw propeller and water jet propulsion systems can lose up to 40% of input energy due to the aforementioned factors affecting their operation. Because of these various factors and the energy losses due to each, water travel is considered less efficient compared to air and land. It is an object of this invention to improve watercraft propulsion systems by increasing their efficiency.

The performance and efficiency of screw propellers is highly dependent on the pitch of the propeller blades. Pitch refers generally to the angle of attack of the blades of the propeller, i.e. the degree of angle measured from a line parallel with the direction of waterflow. Lower pitch propellers i.e. those with a smaller angle as measured from a line parallel with the direction of water flow, provide more low end torque and can more easily push a watercraft out of the water at low speeds. Higher pitch propellers, i.e. with a higher angle as measured from a line parallel to the direction of water flow, are more efficient at higher speed because they rotate more freely at high speed. In some senses, pitch angle can be equated to gears in a car or bicycle. Lower pitch propeller blades are similar to lower gears in a car or bicycle and provide good low speed acceleration and high pitch propellers are similar to higher gears in that they provide better efficiency at higher speed.

Another definition of watercraft propeller pitch is the maximum theoretical forward distance the boat will move with one rotation of the propeller, i.e. a 12" pitch propeller will theoretically move the boat forward 12" with one rotation of the propeller. This theoretical distance is reduced by slip between the propeller and water.

Fixed pitch propellers do not allow adjustment of the propeller blade pitch. These are the simplest and most durable designs but require a compromise to be made between acceleration/low speed torque and maximum speed and efficiency at that speed. Fixed pitch propellers are made of sturdy materials formed into a single piece propeller unit. The propeller shape is fixed and cannot be altered to adjust the pitch during operation. The only way to adjust the pitch of a fixed pitch propeller is to remove it and replace with another compatible propeller with a different pitch. This is inconvenient and cannot be done while the boat is in motion Unlike the fixed construction of fixed pitch propellers, it is an object of this invention to introduce a swiveling or bending element to the propeller in such a way that the shape of the trailing edges of the blades can be altered and thereby the pitch changed during operation.

Variable pitch propellers have been well documented in the art. These devices generally require gears, hydraulics, mechanics or other adjustment means in the hub of the propeller to adjust the blade pitch as well as control systems to manage those adjustment means. These systems are complex, expensive and prone to potential failure.

It's an object of this invention to include a simple automatically adjustable variable pitch propeller, used in combination with other elements to improve the efficiency of the propeller means across all speed ranges and load conditions.

Water jet or pump jet propulsive means also have distinct advantages and disadvantages. A water jet system draws water in through the forward portion of the hull and directs water through an impeller driven by an engine. The impeller is similar to a propeller but with smaller blades fixed to a ducted outer housing. Because these are smaller blades than a propeller, the impeller can rotate more quickly around a central axis and provide greater pump action. The impeller accelerates the water through an exit at the rear of the watercraft and the accelerated water jet provides the propulsive force needed to move the watercraft forward. A water jet system can have one impeller or a series of impellers to increase water pressure at each stage.

The water jet has the advantage of being efficient at high speeds, however, at low speeds, its efficiency is decreased. Also, often the water jet provides the steering mechanism for the watercraft and if power is lost or shut off, steering control can be lost as well. Water jet impellers are also subject to the same tradeoffs in design of the blades as propellers with some designs being better tuned to high speeds or low speed acceleration.

In prior art embodiments, the choice of which propulsive system to use, either screw propeller or water jet, depends greatly on the application needs for the propulsive device. This choice involved making the design tradeoffs described for each of the devices above and settling for a compromise in performance across all speed ranges.

It is an object of the present invention to combine an automatically adjustable variable pitch propeller with a water jet. This device will be called a hybrid propulsor. This hybrid propulsor combines to provide the low speed advantages of a low pitch propeller with the high speed advantages of a high pitch propeller and a water jet. An exhaust driven turbine is added to this design to provide additional propulsive force developed using the pressurized and heated exhaust gases from the motor. This additional turbine further increases efficiency of the device.

A further object of the invention is a rotating duct fixed to the outer edge of the propeller blades. This duct reduces cavitation around the edge of the blades in comparison to fixed ducts. The duct also increases safety because the propeller and water jet apparatus are protected by the duct.

FIG. 1 illustrates the water inlet side of the preferred embodiment of the hybrid propulsor. The disclosed embodiment includes a propeller with automatically adjusting variable pitch. The variable pitch propeller of the present invention is constructed of propeller blades 009 formed of two sections: fixed blade 001 and adjustable vane 002. Fixed blade 001 is fixed in pitch and directly attached to the hub or the axially rotating portion of the propulsor. Adjustable vane 002 comprises the adjustable vane attached to the trailing edge of the fixed blade. Adjustable vane 002 automatically adjusts pitch to varying water pressure and other load conditions. The connection on propeller blade 009 between fixed blade 001 and adjustable vane 002, the adjustable pitch portion of the blade, is shown in blade connection 004. In this embodiment, blade connection 004 is comprised of a hinge well known in the art, but other connection methods are possible within the bounds of the claimed invention. A spring 006 provides tension that controls the angle of the adjustable vane based on the pressure on that vane during given watercraft and propeller operational circumstances such as speed, load, and acceleration. At lower speeds, a higher angle pitch is achieved which provides increased torque and acceleration. At higher rotational speeds, the pitch angle is reduced and the propeller operates more efficiently.

Figure 2:
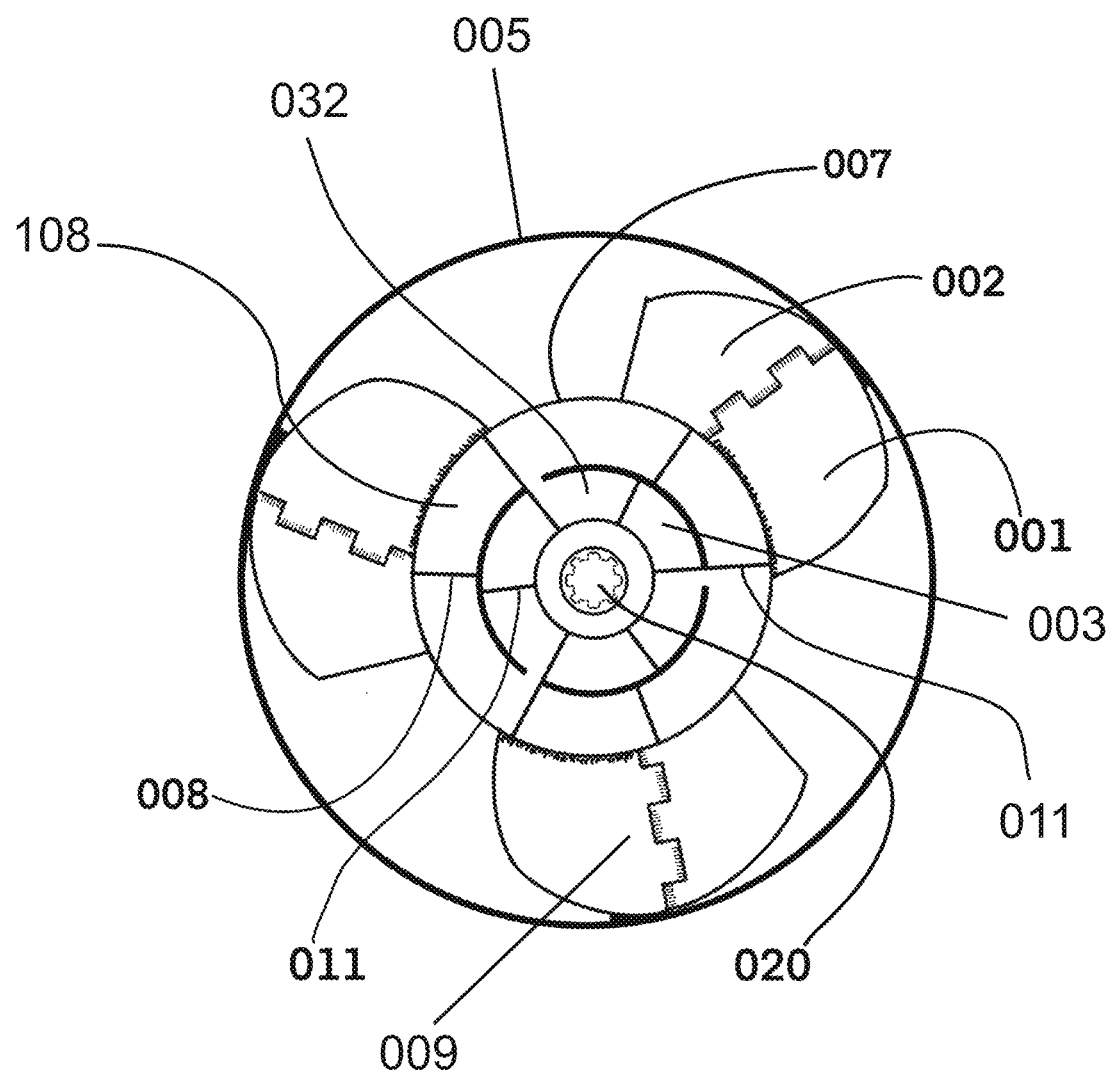
FIG. 2 illustrates the water exit side of the propulsor including the turbine blade, the water jet vanes and the water jet duct.

The hybrid propulsor also includes an engine exhaust gas driven turbine 003 that, in this embodiment, is located directly circumferentially adjacent to the drive shaft and hub of the propeller. The exhaust gas driven turbine consists of a plurality of turbine blades 011 as shown in FIG. 2. Exhaust gas is transmitted from the engine down an exhaust pipe that can be located directly circumferentially adjacent to the engine drive shaft. The drive shaft connects to the engine and travels down the center of the exhaust pipe. The heated and pressurized exhaust gas as it travels down the exhaust pipe apply force to the turbine blades 011 and create additional driving force for the hybrid propulsor. Capturing energy that would have otherwise been lost increases the efficiency of the disclosed invention.

Water Jet 010 is also included as part of the disclosed hybrid propulsor. The water jet apparatus is comprised of a plurality of impeller blades 008 enclosed by water jet duct 007. When the watercraft engine applies rotational energy to the drive shaft and then to the hub 020, the impeller blades draw intake water in through the water jet and the rotational energy is converted to increased water pressure through the water jet exit. This increased water pressure provides propulsive thrust for the watercraft. As water jet propulsive devices are more efficient at high speed, in combination with the variable pitch propeller vane 002, the high speed performance and efficiency of the watercraft is improved.

The present invention further discloses external rotating duct 005 fixed to the propeller blade 009 and thus rotates with the propeller. This fixed arrangement minimizes the distance between the propeller and duct wall, thus reducing the formation of vapor cavities or bubbles around the propeller, commonly known as cavitation. The minimization of cavitation is a well-known goal in watercraft propulsion as it increases performance and efficiency.

Figure 1A:
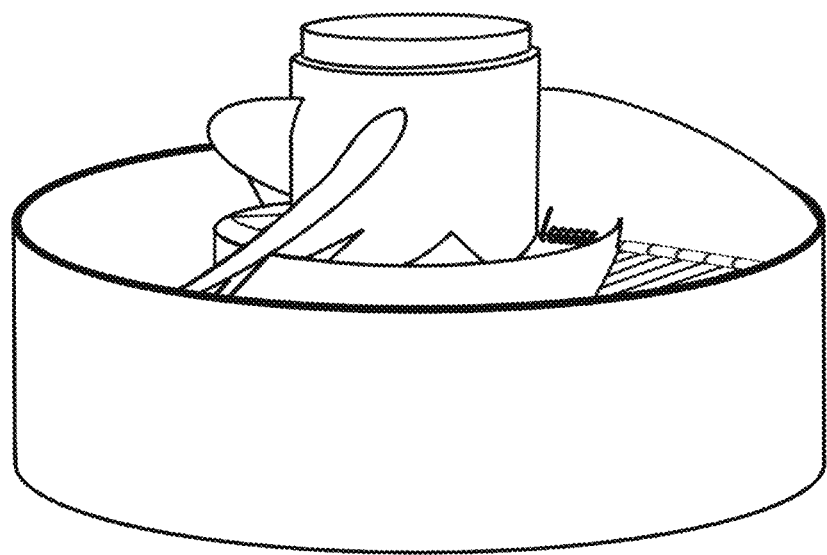
FIG. 1A is a perspective view of the claimed invention, showing the duct and adjustable vanes.

FIG. 1A shows a side perspective view of the claimed invention, with the entry side of the device visible at an angle.

FIG. 2 shows the water exit side of the hybrid propulsor. Automatically adjustable variable pitch propeller blades 009 are attached to the outer portion of water jet duct 007. Spring 006 are attached to vane 002 to provide tension. Vane 002 is pushed to the maximum pitch by spring 006 when water pressure behind the blade and vane is low. At a stop, when pressure is lowest, the vane adjusts to its maximum pitch. When accelerating or operating at higher sustained speeds, the shift in water pressure behind the blades pushes against spring 006 and decreases the blade pitch. FIG. 2 also shows how the vane 002 are hinged to the fixed blade 001 and is allowed to swivel. A plurality of spiral impeller blades 008 and water jet duct 007 make up the water jet. Hub 020 is attached to the engine drive shaft and rotates under engine power. When rotational energy is applied to the hub, water is drawn into the water jet intake 108 and impeller blades 008 generate water pressure that is ejected out of the water jet exit to create propulsive force.

Exhaust gas travels from the engine through the exhaust pipe and into exhaust inlet 032. Turbine 003 is driven by the heated and pressurized gas generated by the engine. Exhaust gases push against spiral turbine blades 011 thus providing rotational motive force on the turbine 003. Rotational energy generated by the rotating turbine provides additional propulsion from the disclosed apparatus.

Figure 3:
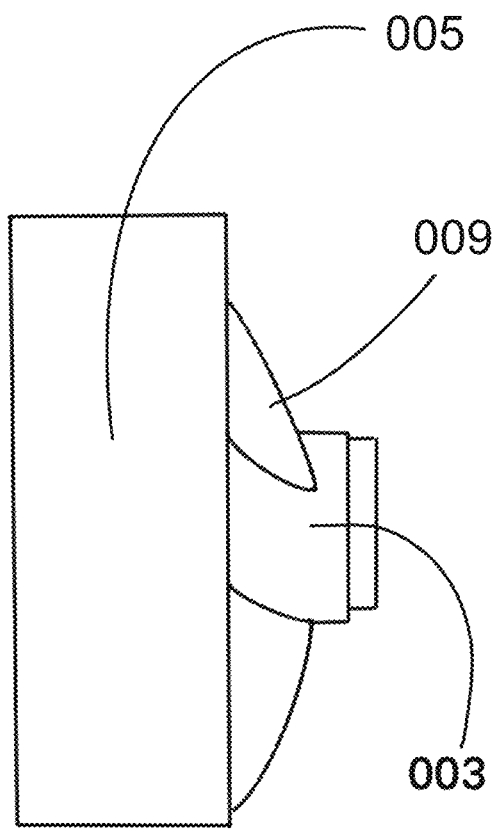
FIG. 3 illustrates the side view of the current invention showing the rotating duct.

FIG. 3 shows the outside of rotating duct 005. Rotating duct 005 is fixed to propeller blades and due to reduced distance between blade 009 and duct 005, cavitation is reduced. Further, rotating duct 005 provides protection for the propeller blades, water jet and turbine.

Figure 4:
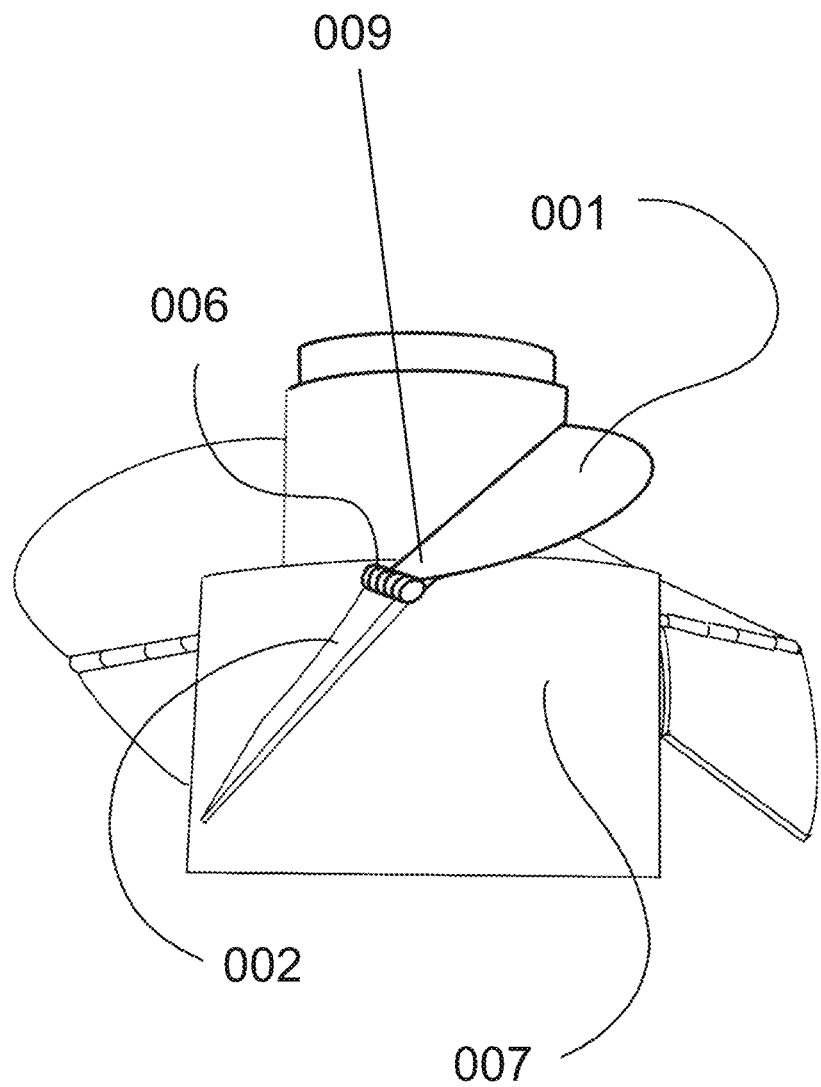
FIG. 4 illustrates how the moveable vanes are positioned at the highest angle of attack or pitch. The drawing shows the moveable vane is at a greater angular difference in relation to the fixed propeller blade.

FIG. 4 shows a cross section of the automatically adjustable variable pitch propellers 009 incorporating the fixed blade 001 and adjustable vane 002. Spring 006 provides resistance that allows the propeller blade pitch to adjust automatically depending on the water pressure behind surface of the vane 002. FIG. 4 shows the adjustable vane 002 at its highest pitch position when the water pressure behind its surface is lowest. This is the resting position of the vanes at when the watercraft is stopped. When the boat is running at its optimal cruising speed or when the motor is at its optimal RPM, the water pressure behind the propeller blades is low and therefore the spring 006 resistance will cause the vanes to automatically adjust to its highest pitch or angle of attack. Water jet duct 007 separates the adjustable propeller blades from the jet pump. The water jet duct also serves as the rotating duct of the water jet or pump jet.

Figure 5:
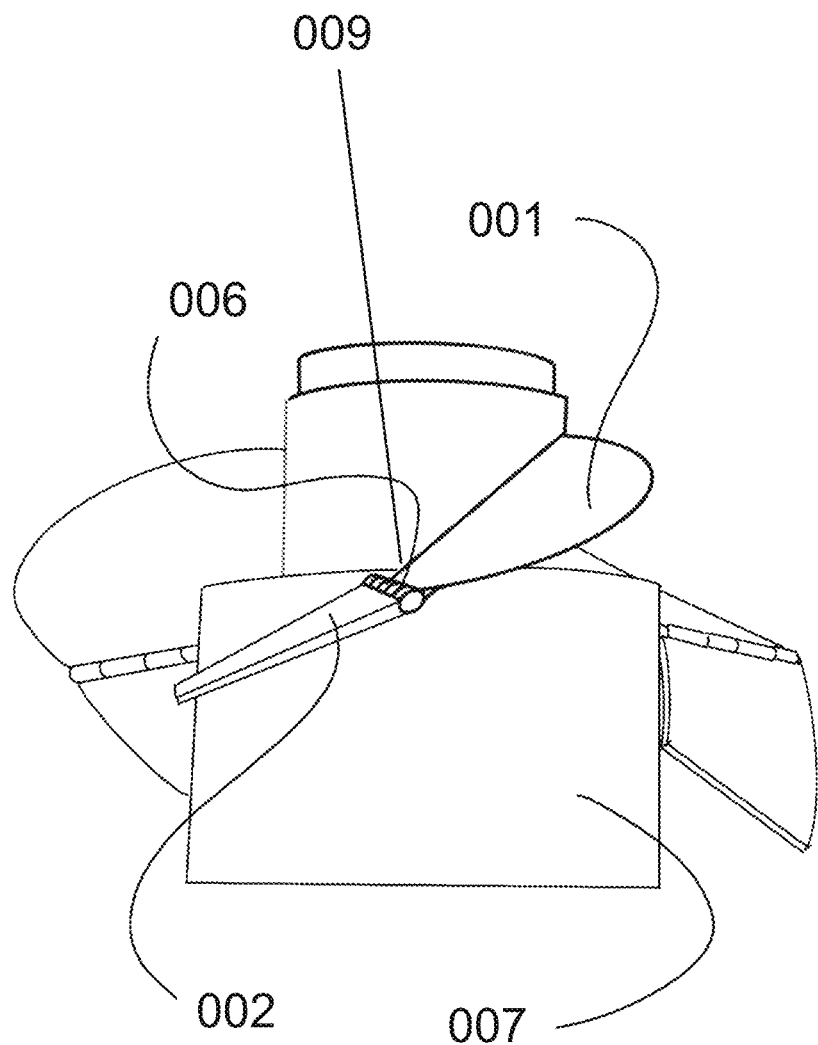
FIG. 5 illustrates how the moveable vanes are positioned at the lowest angle of attack or pitch. The drawing shows the swiveling vane is at a lesser angular difference in relation to the fixed propeller blade.

FIG. 5 shows the adjustable vane 002 is at its lowest pitch or angle of attack in contrast to FIG. 4 which shows the vane is at its highest pitch. FIG. 5 also shows a cross section of the automatically adjustable variable pitch propeller blade 009 incorporating fixed blade 001 and adjustable vane 002. Spring 006 provides resistance that allows the propeller blade pitch to adjust automatically depending on the water pressure behind surface of the vane 002. FIG. 5 shows the adjustable vane 002 at its lowest pitch. When the water pressure is higher than the spring resistance, it causes the vane to vary its angle of attack or pitch. FIG. 5 shows the position of the vane 002 when the boat is making a "hole shot" or accelerating from full stop to plane speed at which condition the water pressure becomes greater than the spring tension. When the boat has reached its optimal cruising speed or when the motor is at its optimal RPM, the water pressure behind the propeller blades again becomes lower than the spring tension. At this condition, the spring resistance will cause the vanes to automatically adjust from its lowest pitch to its highest pitch or angle of attack. This operation of changing the pitch or angle of attack of the vane 002 provides a way to automatically adjust the propeller pitch and thereby improving its efficiency at any load condition and speed. Water jet duct 007 separates the adjustable propeller blades from the jet pump. Water jet duct 007 also serves as the rotating duct of the water jet or pump jet.

Figure 6:
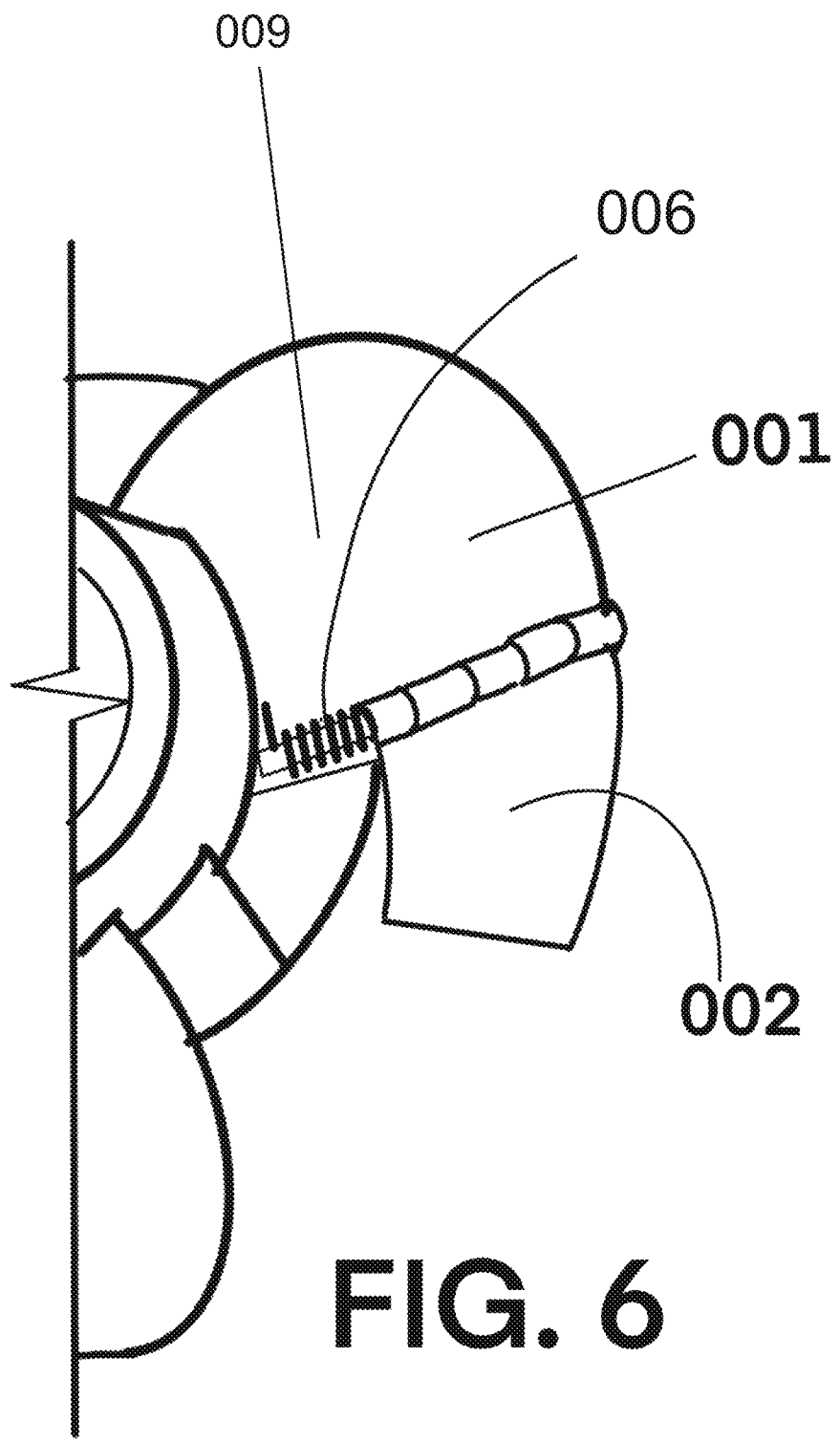
FIG. 6 shows the springs that automatically adjust the variable pitch propeller vanes.

FIG. 6 illustrates how the vanes 002 are attached to the trailing edge of the fixed blade 001. As these vanes 002 swivel in different positions in relation to the fixed blades, it alters the pitch of the propeller, thus altering the angle of attack or pitch of the propeller. This change affects the thrust delivered by the propeller. The spring 006 gives tension to the adjustable vane 002.

Figure 7:
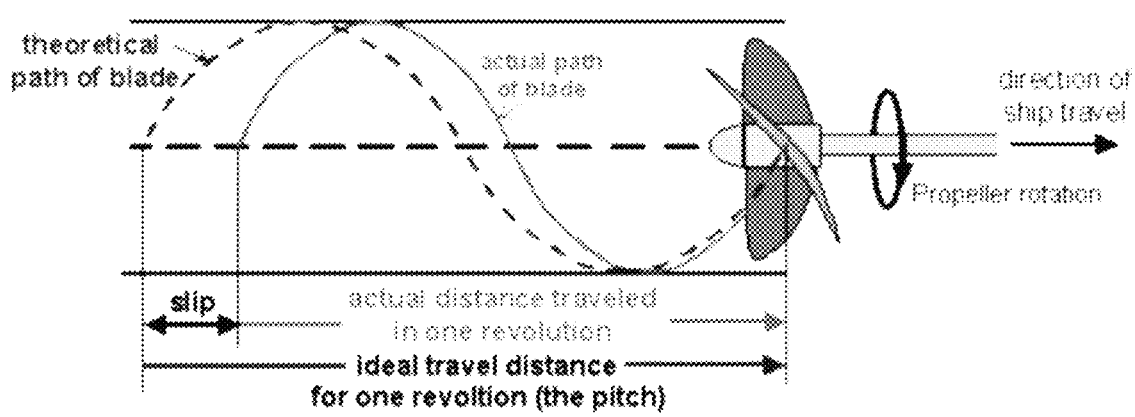
FIG. 7 illustrates how the propeller pitch affects the ideal and actual distance traveled in one rotation of the propeller.

FIG. 7 Illustrates how the pitch of the propeller affects the speed of a watercraft.

Figure 8:
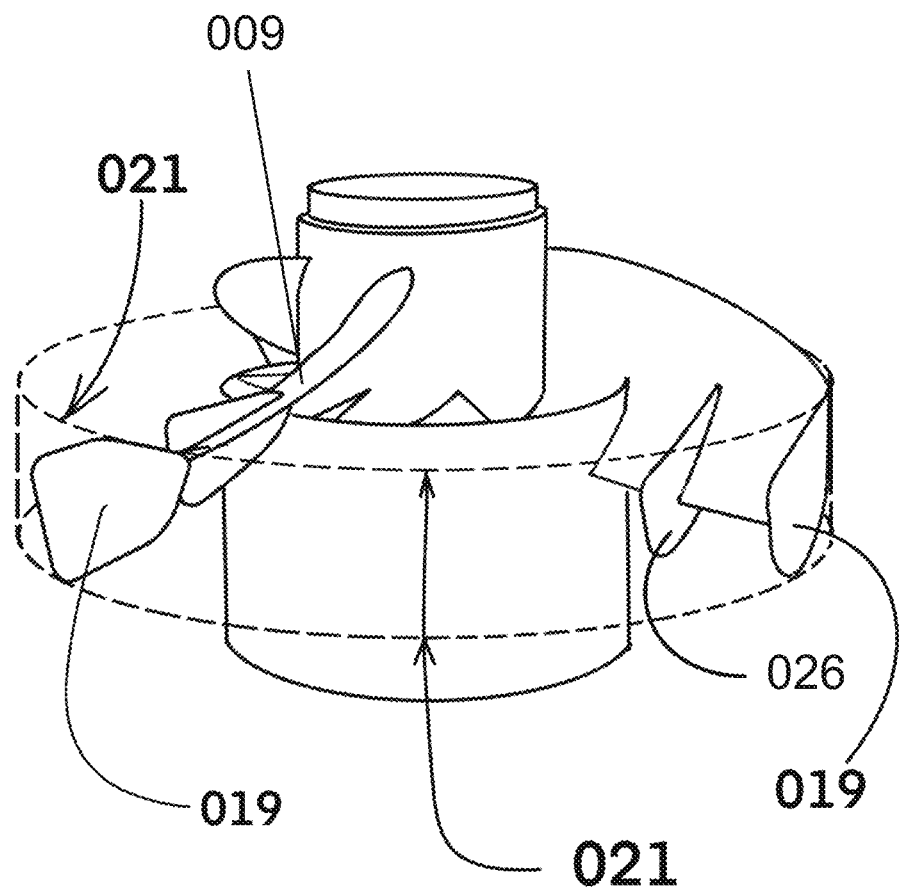
FIG. 8 shows an alternate embodiment with small fins rather than a full circular duct covering the entire circumference of the propeller.

FIG. 8 is an alternate embodiment where small fins 019 are directly attached to the tips of the propeller blades 009. These small fins 019 directly replace the function of rotating duct 005 as described and illustrated in FIG. 3. The fins 019 are designed with a bend so that the outer side of the fin concentrically rotates along the circumferential path 021 so as not to cause turbulence. Fins 019 can minimize cavitation which usually develop at the tips of propeller blades, a weakness of current propeller design. Additionally, secondary fins 026 are also attached along the length of the fixed blade for smoother water flow along the surface of the blade. It acts like spoiler fins along the wings of an airplane.

Figure 8A:
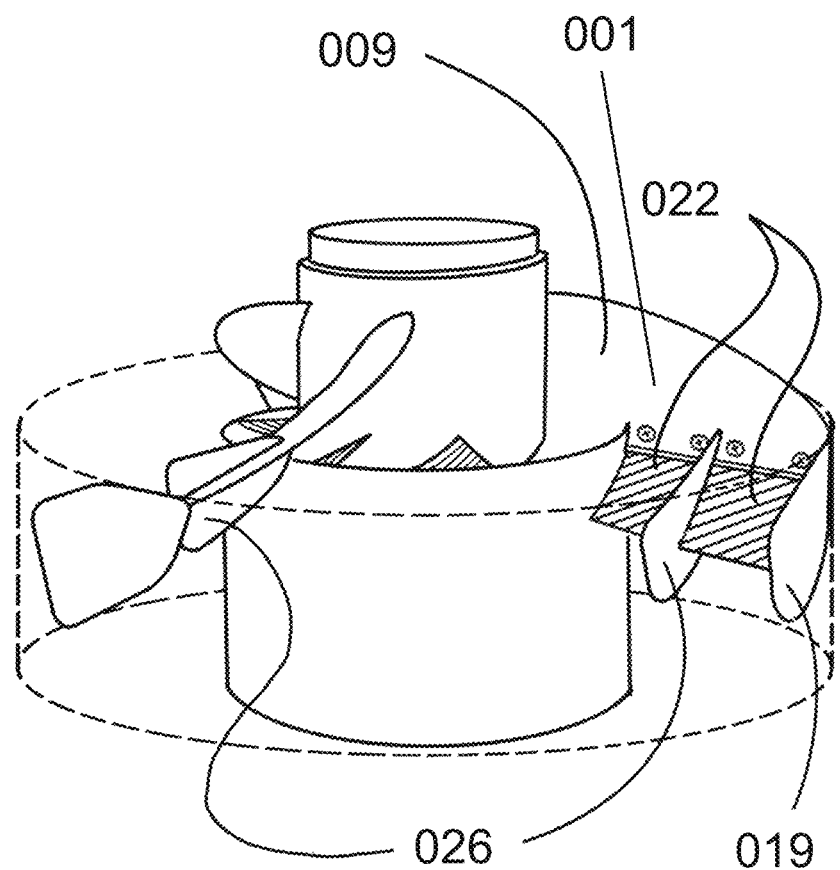
FIG. 8A illustrates the alternative embodiment of FIG. 8 in combination with a flat spring attached to the trailing edges of the propeller blade to serve as the adjustable vane. It also shows small fins attached along the length of the fixed blade.

FIG. 8A is an improved embodiment of FIG. 8. Improvement is made by attaching flat springs 022 to the trailing edges of the propeller blades. These flat springs 022 serve as the self-adjusting vanes or ailerons of the propeller blades. Mode of attachment of these flat springs is as described in FIG. 9D. These flat springs may be attached by any attachment means to the trailing edge of the fixed blade 001 including welding, riveting, screws, or others, to the trailing edge of the propeller blade and made integral part of the blade itself. Adjustable vanes can be attached to the blade by other means described in FIG. 9B, 9C, 9D, 9E, 9F. During a "hole shot" or High RPM at slow boat speed, or accelerating from slow to fast, or at steady cruising speeds with heavy load, water pressure behind the blades 009 will be greater than on the front surface of the propeller blades. Under these conditions, flat springs 022 will be bent by water pressure towards the front thus altering the propeller pitch from high pitch to low pitch. This automatic adjustment will greatly improve hole shot performance and cruising speed of the watercraft.

Figure 9A:
FIG. 9A illustrates a common prior art embodiment of a one-piece solid propeller blade.

FIG. 9A illustrates a conventional propeller blade as well known in the prior art. It is made in one-piece of a sturdy material without any section that can bend or swivel. The pitch is fixed and cannot be altered during operation and therefore becomes the weakness of this prior blade design.

Figure 9B:
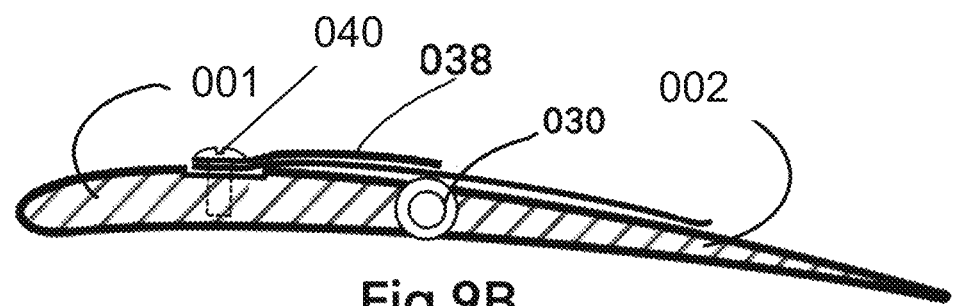

FIG. 9B illustrates an alternate embodiment for providing tension to the adjustable vanes. An overlapping flat spring 038 is fixed to the propeller blade by fastener 040, in this view a screw, to provide tension to the adjustable vane 002. The vane is attached by a hinge 030 to the fixed blade 001. The fixed blade 001 is permanently attached to the propeller hub. The adjustable vane swivels or moves independently from the fixed blade and can automatically adjust the propeller pitch during operation.

Figure 9C:
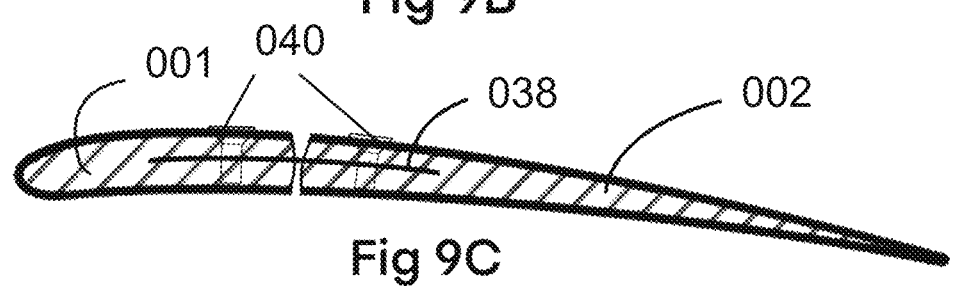

FIG. 9C Illustrates an adjustable vane 002 attached to the fixed blade 001 using a variation in flat spring 038 design. The fixed blade 001 is permanently attached to the propeller hub. The adjustable vane 002 swivels or moves independently from the fixed blade 001. In this embodiment, flat spring 038 is attached to fixed blade 001 and adjustable vane 002 by fastener 040, in this case two rivets. Fastener 040 could be any fastening means known in the art, including screws, bolts, clips, rivets, glue, welding or any other known means.

FIG. 9D is a cross section of an adjustable pitch propeller blade. It illustrates that a flat spring 022 in itself can be used as the adjustable vane as well. The flat spring 022 can be swapped with any material such as bronze, stainless steel, rubber, plastic or any other material which can provide tension when the propeller is subjected to water pressure and be able to spring back when pressure is relieved. Adjustable vane 002 is directly attached to the fixed blade 001 by fastener 040, here a screw, but other fastening methods such bolts, clips or any known method could be utilized. The fixed section of the blade 001 is permanently attached to the propeller hub. The adjustable vane 002 bends or moves independently from the fixed blade. The bending motion of the flat spring 022 enables the propeller blade to switch from high pitch (position A) to low pitch (position B).

FIG. 9E is another method of attaching a spring tension using spring wire in groves along the fixed blade and a hinge 030 with the adjustable vane.

FIG. 9F is another method using other material as the vane like plastic, rubber, metal alloys, etc. it can be attached via fastener 040, here a clip.

Figure 10:
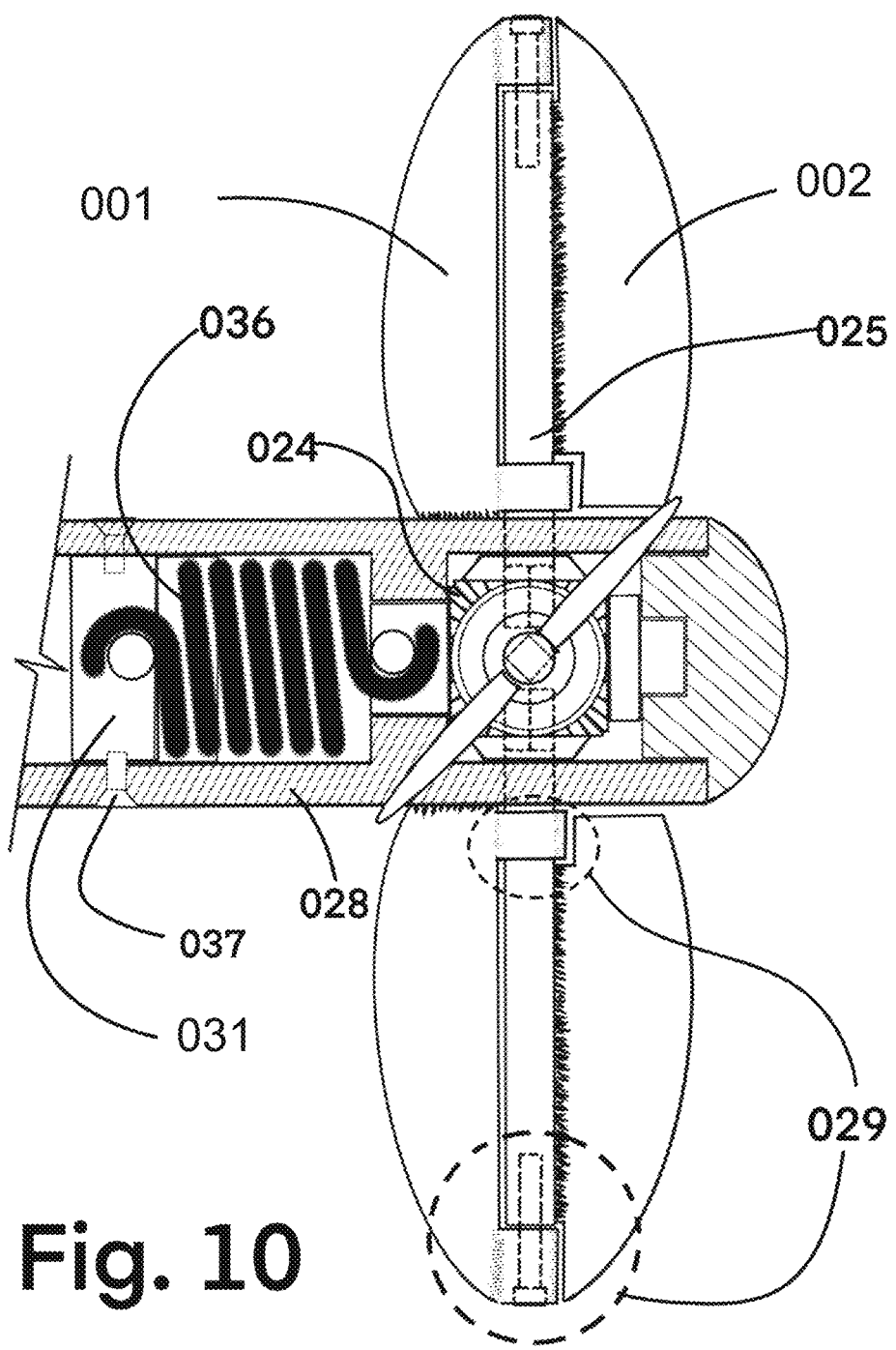
FIG. 10 shows an alternative embodiment with an internal spring suitable for inboard motors.

FIG. 10 discloses an additional embodiment related to an inboard propeller with means to alter the pitch of the propeller by adjusting the bias tension of an internal spring 036. The spring can be swapped by another material such as rubber, plastic or any material with spring-like properties. In this embodiment, the hub of an inboard motor propeller contains an internal spring 036 that provides a bias tension for all the swiveling vanes/ailerons attached to the shank 025 and hinged at points 029 to the fixed blade. In this embodiment, one end of the spring 036 is fixed to the hub via bushing 031 which is attached to the hub by screw 037. The other end of the spring 036 is attached to a driving gear 024 of a four way gear system and engages the shank 025 of the swiveling vane 002. As the water pressure changes on either side of the propeller vane 002 during different boat speeds and activities, i.e. acceleration from a stop, high speed cruising, the spring 036 tension automatically adjusts, it allows the gear 024 to rotate with a certain tension and consequently rotate the shank 025 and the vane attached to it. As a unique design, the swiveling vane 002 is also hinged 029 to the other end of the fixed blade. The fixed blade doubles as a support for the other end of the shank 025. This is a unique design as in the prior art of variable pitch propellers only one end is supported. The other end farthest from the hub is floating and has no means of support which is another weakness of variable pitch propellers.

FIG. 10 further shows a system that provides a means to alter the pitch of an inboard prop with the additional feature of adjusting the bias tension of the spring 036 accordingly to load conditions/water pressure imposed on the swiveling vane 002. The lighter the spring tension, the easier the vane will react to changes in water pressure and vice versa. For heavier loads, spring tension must be higher. This operation can be done automatically without the need or intervention of a controller. FIG. 10 shows an embodiment to employ a swiveling vane to an inboard propeller. A dial (not shown) attached to the bushing 031 can be rotated to alter the tension of the spring 036. The tension is transferred to a gear 024 which in turn engages the shank of the swiveling vane. When the desired tension is achieved, the dial is then fixed via a set screw 037 to the propeller hub 028.

Figure 11:
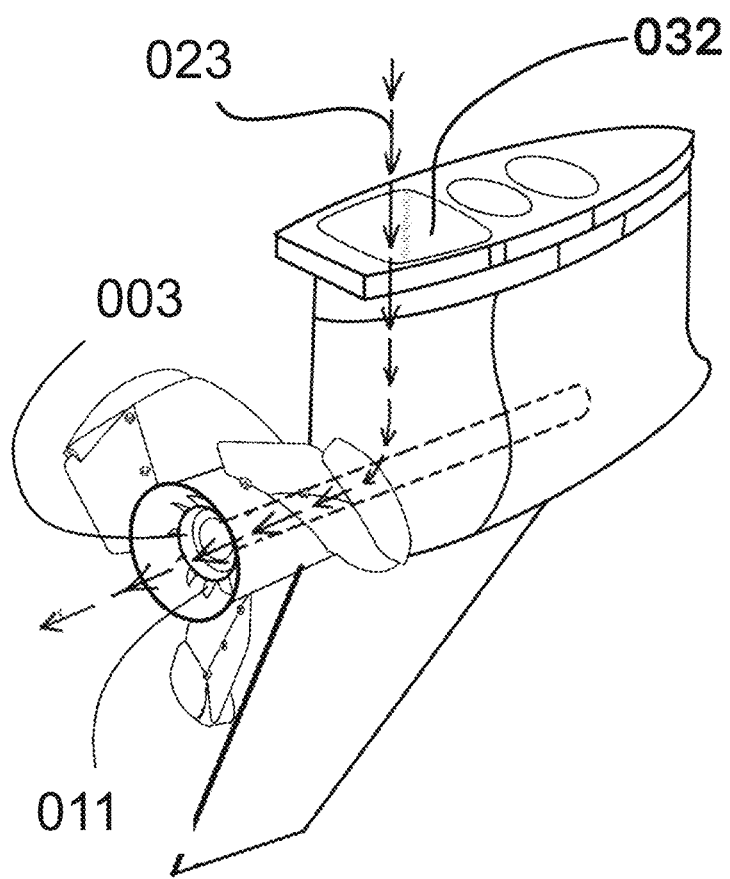
FIG. 11 illustrates the turbine being driven by exhaust gases from the outboard motor.

FIG. 11 discloses exhaust gases 023 travel through exhaust channel 032 and through the built-in turbine 003 inside the propeller as shown in FIG. 2. The exhaust gas energy causes the turbine blades 011 to rotate. This operation provides additional motive force for turbine 003. Since the turbine is directly connected to the propeller hub, the exhaust gas providing motive force to the turbine 003 provides additional rotational energy for the propeller.

Figure 12:
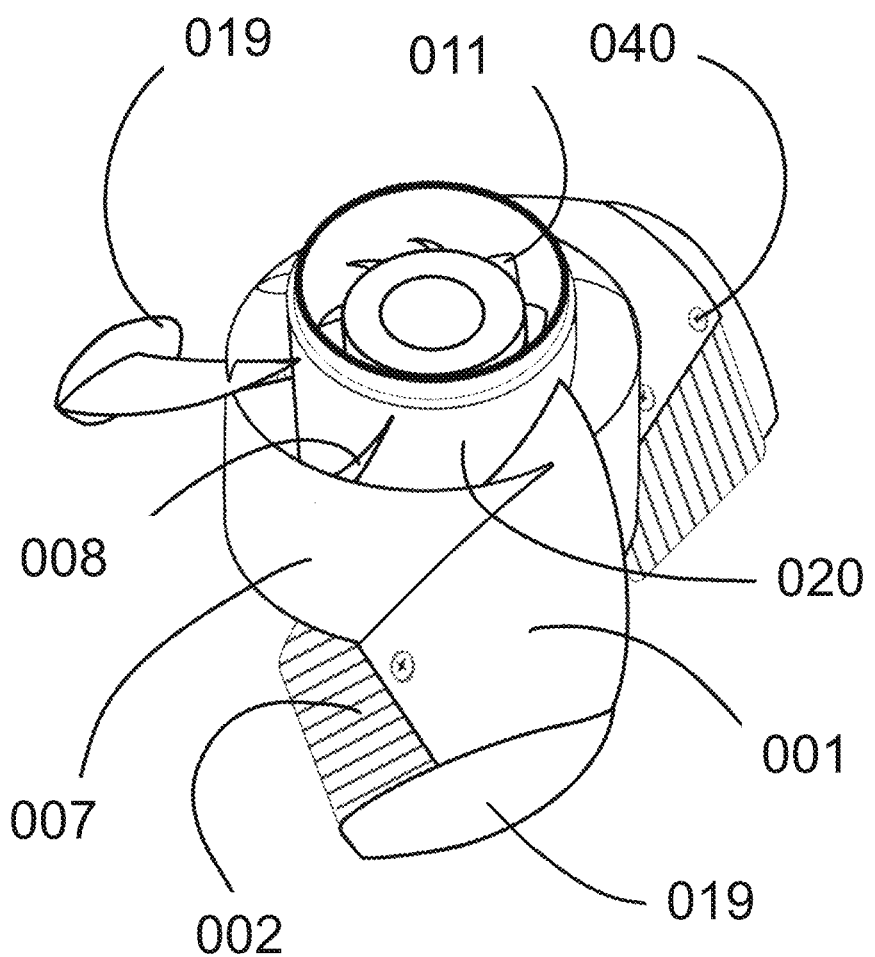
FIG. 12 shows an alternate embodiment with fins at the edges of the fixed blades instead of a rotating duct.

FIG. 12 embodies another alternative design of the hybrid propulsor that functions in the same fashion as the embodiment shown in FIG. 1. The disclosed embodiment includes a fixed propeller blade 001 with automatically adjusting vane 002. The vane 002 is attached to the fixed propeller blade via screw, rivet or any fastener 040 and in any method as illustrated and described in FIGS. 9B-F. FIG. 12 shows adjustable vane 002 is made of a flat spring plate which operates as described and illustrated in FIG. 9D. This embodiment is not limited to the use of a flat spring but can include any other spring/fastener embodiment including those illustrated in FIGS. 9B-F. A water jet assembly consisting of a water jet duct 007 and multiplicity of impeller blades 008 that rotates with the water jet duct 007 provides a pumping action. The impeller draws water through the intake (front) side of the impeller and pumps it out through the rear, thereby creating a jet of water. This increased water pressure provides propulsive thrust for the watercraft. A multiplicity of fins 019 are attached to the ends of each fixed blade 001 in order to reduce cavitation. These fins 019 which turns concentrically with the edges of the blades 001 can directly replace the function and operation of a rotating duct 005 as described and illustrated in FIG. 3. Turbine blades 011 are also shown at the center of the propulsor device.

Figure 12A:
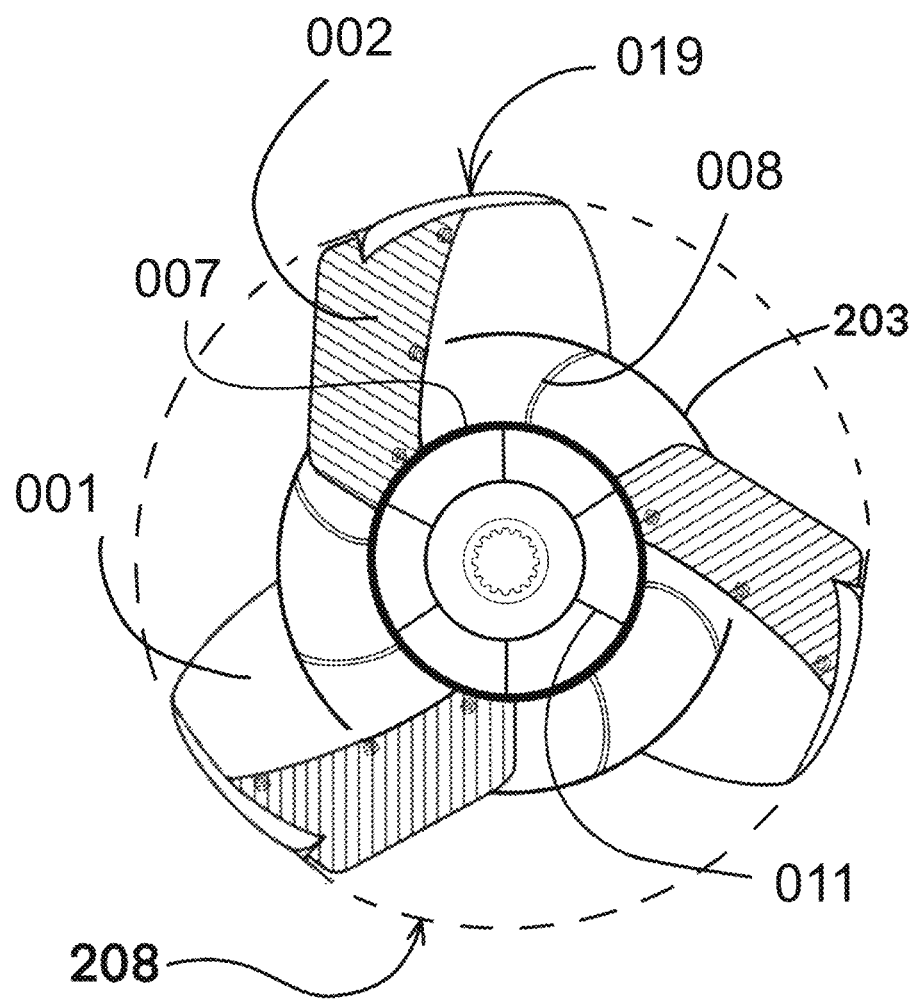
FIG. 12A. is a rear view of the alternate embodiment shown in FIG. 12.

FIG. 12A is the rear view of FIG. 12 which reveals the turbine blades 011 inside the exhaust port 206. When exhaust gasses from the outboard motor is expelled through the exhaust port 206, the exhaust gas energy causes the turbine blades 011 to rotate. This rotational force aids in turning the propeller assembly. Capturing energy that would have otherwise been lost increases the efficiency of the disclosed invention. The fins 019 are designedly bent that its outer side concentrically rotates along the radius path 208 of the blades so as not to cause turbulence.

Figure 13:
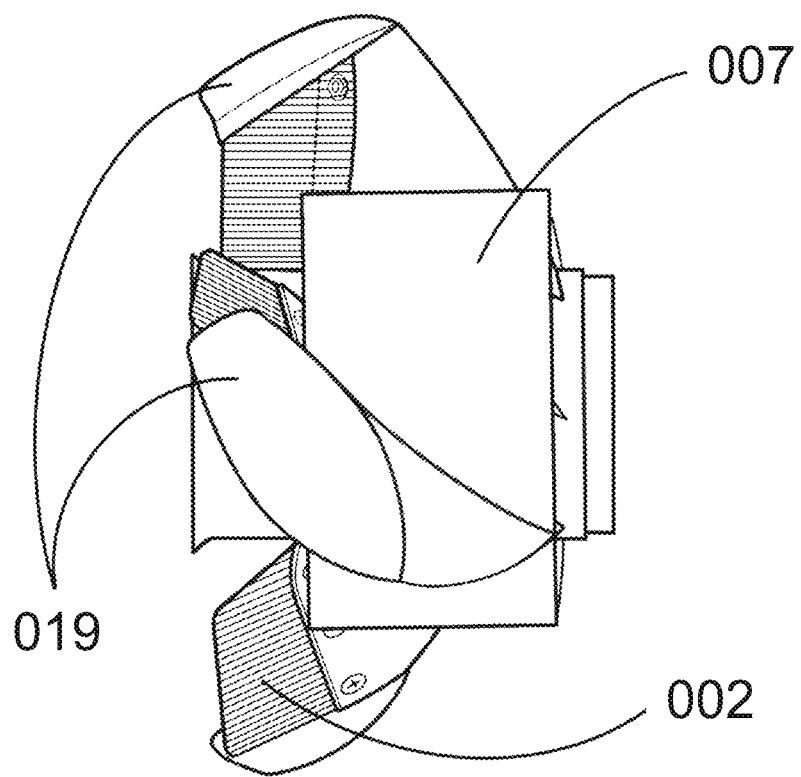
FIG. 13 is a side view of the alternate embodiment shown FIG. 12

FIG. 13 is a side view of FIG. 12. It shows the water jet duct 007, adjustable vane 002, and fins 019.

Figure 14:
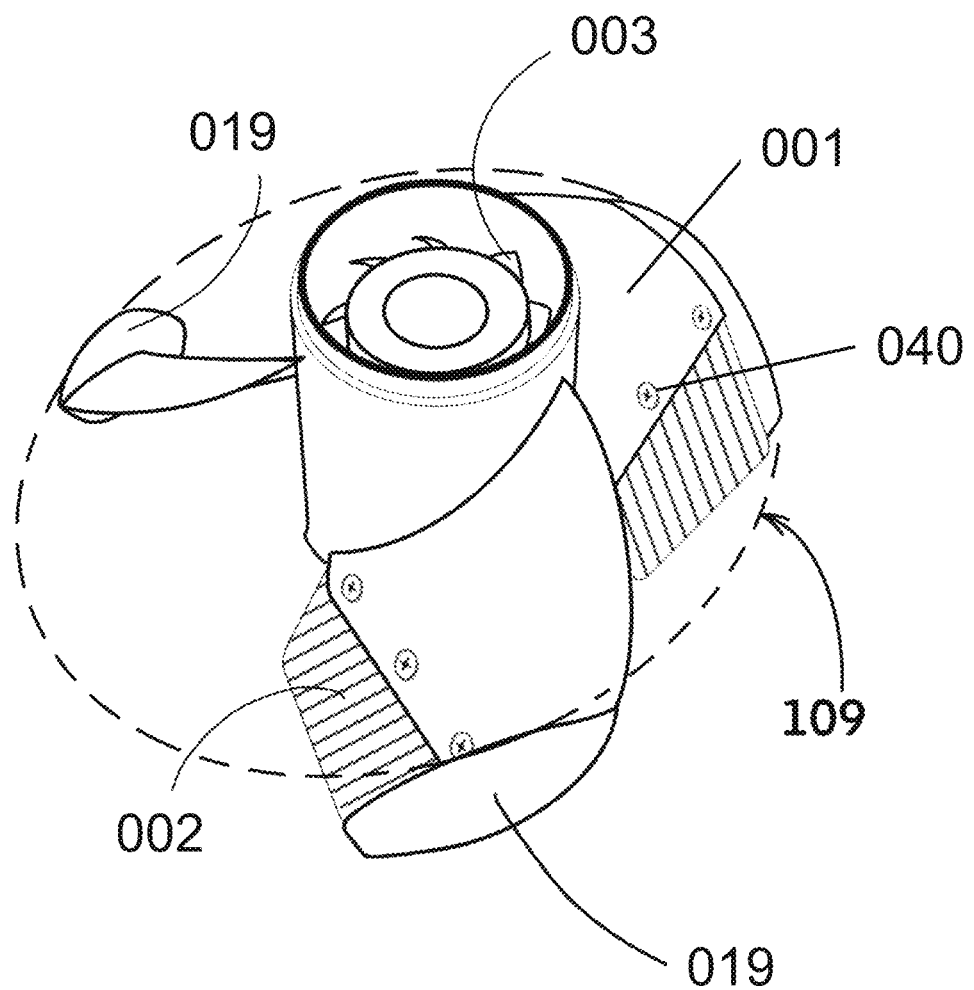
FIG. 14 is a perspective view of one of the blades with attached flat spring that serve as the adjustable vane.

FIG. 14 discloses an additional embodiment which is a simpler version of the design shown in FIG. 12 but without the inclusion of a water jet. The object of this design is to simplify the manufacturing and yet still take advantage of the self-adjusting vane 002 and fins 019 and turbine 003. These unique features are not usually found in conventional propellers of prior art. The vane 002 is made of flexible flat spring plate which bends when subjected to pressures stronger than its specified tension. The vane 002 is attached to the fixed propeller blade via fastener 040 which could be a screw, rivet or any method as illustrated and described in FIGS. 9B-F or known in the art. Due to this bending action, the vane is capable of changing the pitch of the propeller blade. The fins 019 attached to the propeller blade edges are designedly bent so that its outer side concentrically rotates along the circumferential path 109 so as not to cause turbulence. The turbine 003 converts the power of the exhaust gases to rotational force and consequently aids in turning the propeller. Because of the aforementioned features, this novel combination of propulsive elements improve overall performance and efficiency.

Figure 14A:
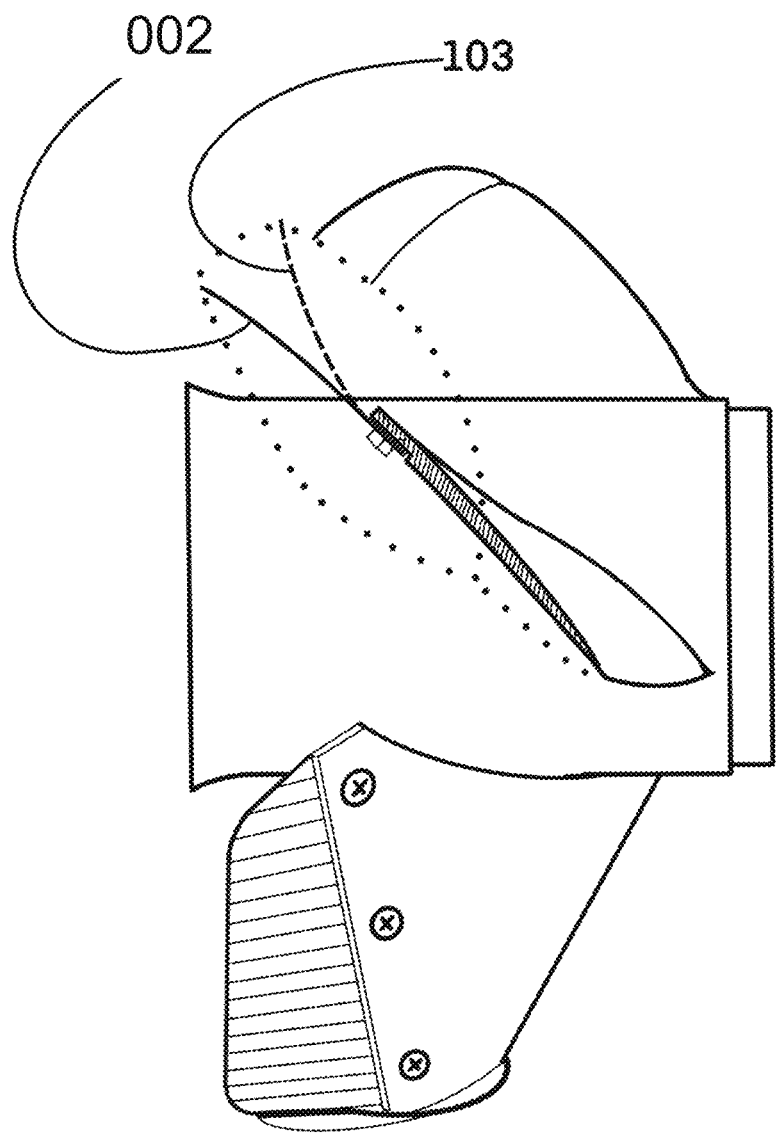
FIG. 14a is a cross sectional view of an adjustable vane with a flat spring.

FIG. 14A is the side view of FIG. 14 exposing a cross section of one of the propeller blades and its incorporated self-adjusting vane 002. The vane 002 in this illustration is a flat spring. Incorporating a vane to the propeller blade however is not limited to this method. Any other method as illustrated in FIGS. 9B-F can be used. FIG. 14A shows the self-adjusting vane 002 at its normal position when the pressure on its surface is less than its specified spring tension. Self-adjusting vane 002 moves to bent position 103 when the water pressure on its surface is greater than its tension. Such condition occurs when the watercraft starts to accelerate rapidly from stopped to plane speed which in boating parlance is called a "hole shot". When accelerating and at very high RPM, extreme water pressure on the vane 002 causes it to adjust to bent position 103 and so switches to its lowest pitch.

Figure 15:
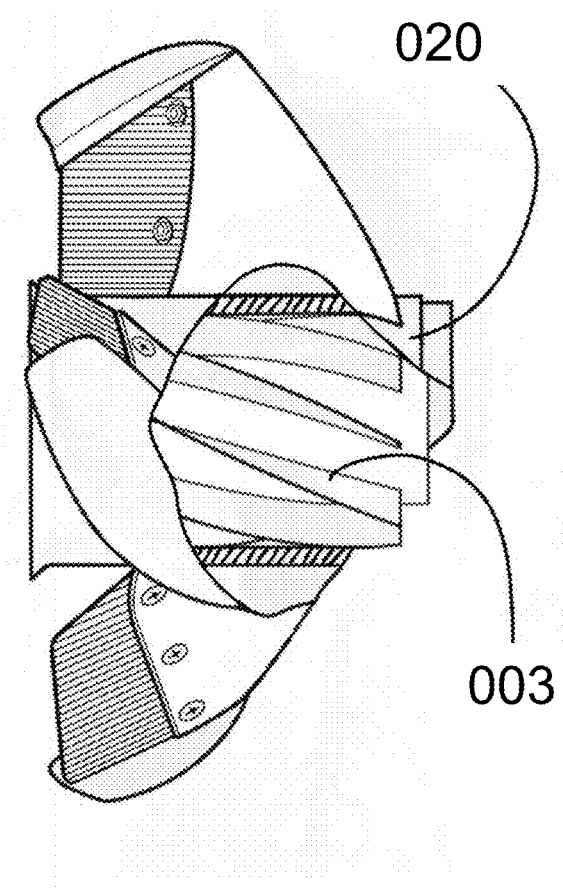
FIG. 15 is a cross section of the embodiment shown in FIG. 12 exposing the turbine inside the hub

FIG. 15 is cross sectional internal view of FIG. 14 exposing the turbine 003 inside the hub 020. A multiplicity of spiral blades is advantageously incorporated to the exhaust port of the propeller hub. In the prior art, this bore hole is provided only for the purpose expelling exhaust gas. By strategically placing a turbine inside the exhaust port, it benefits from the pressurized energy of exhaust gas coming from the motor.

Figure 16:
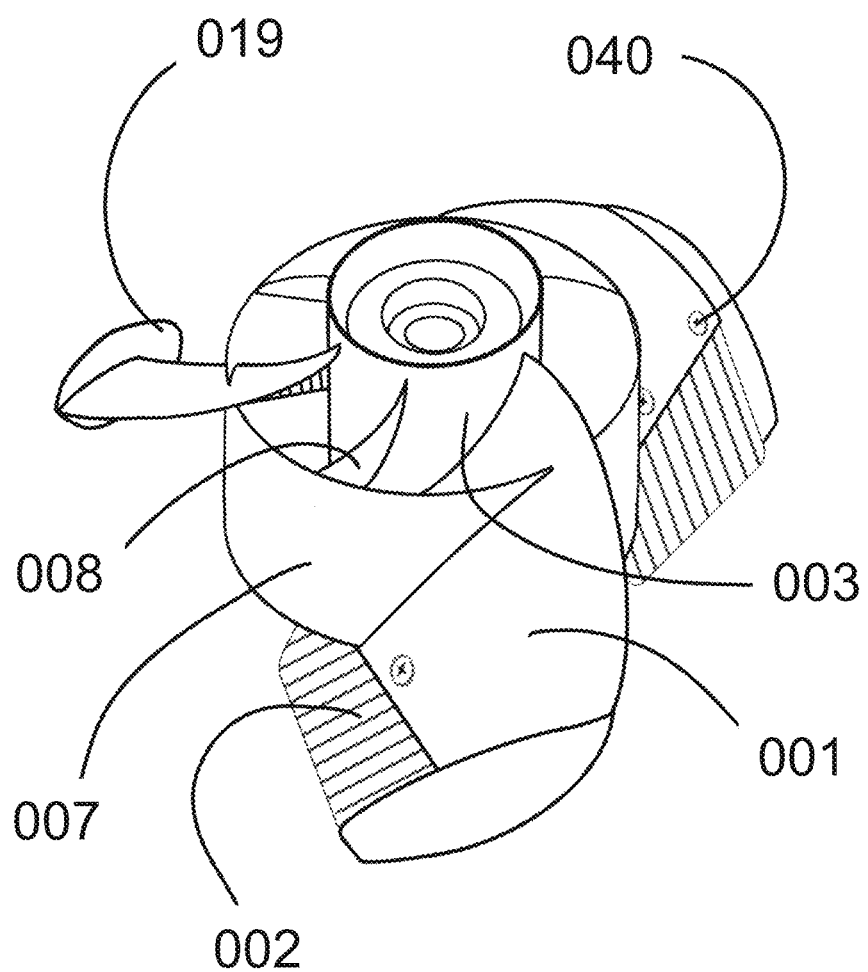
FIG. 16 is a revised design of the propulsor specifically for use on inboard motors

FIG. 16 is an embodiment very similar to the use and function of FIG. 12 but without the exhaust driven turbine. This revised design of the propulsor does not include the turbine as it shall be specifically for use on inboard motors which do not dispel exhaust gas through the propeller. Nevertheless the existence of a water jet pump comprised of impeller blades 008 and water jet duct 007 coupled to the adjustable propeller and fins make the propulsor more efficient than outboard propeller of the prior art.

Figure 17:
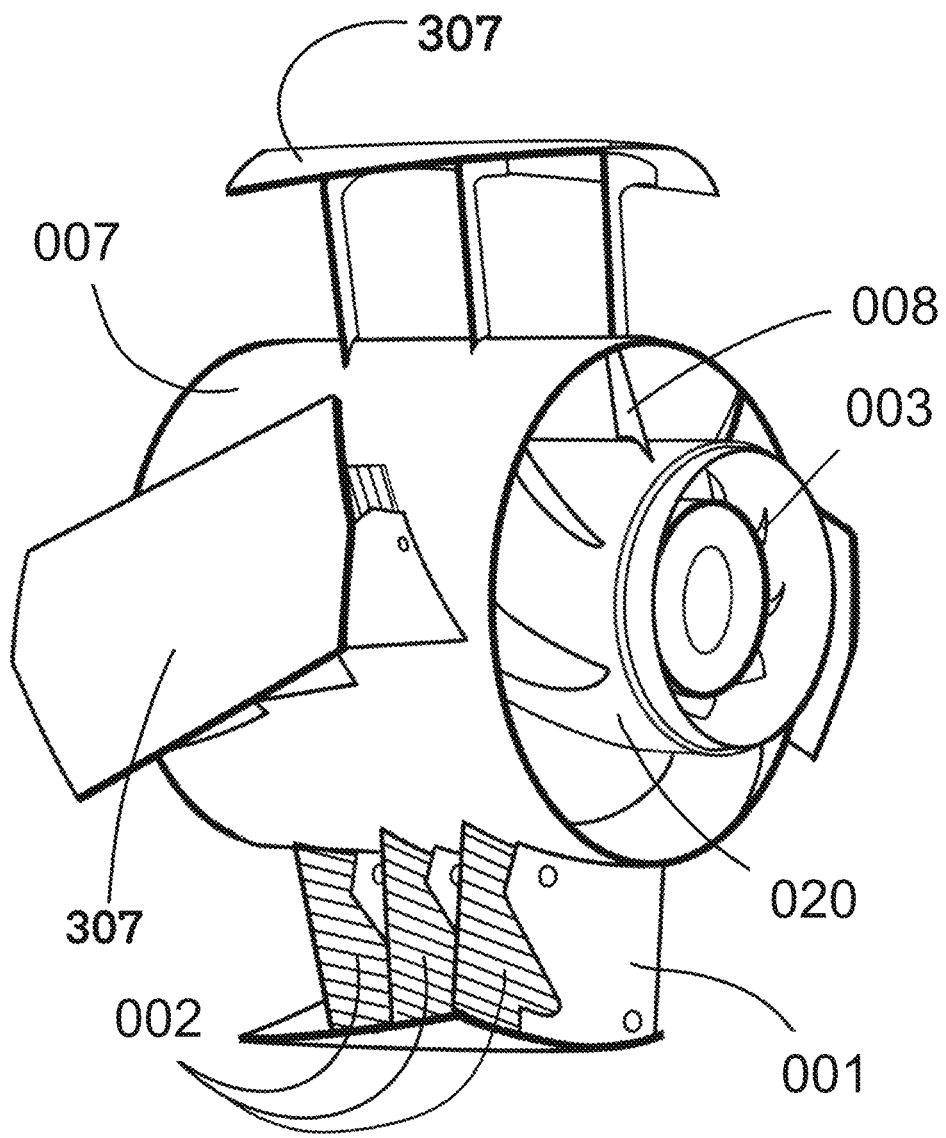
FIG. 17 is an illustration of a propulsor with multiple rows of adjustable propeller blades.

FIG. 17 is a complete embodiment of another alternative design of the hybrid propulsor that functions in a fashion similar to FIG. 1. The disclosed embodiment incorporates a water jet or pump jet system comprised of multiplicity of impeller blades 008 and water jet duct 007; a multiplicity of variable pitch propeller blades each comprised of fixed blade 001 and self-adjusting vane 002; a built-in turbine 003 inside the hub 020; and a rotating shroud 307 directly attached to the tips of the propeller blades. In contrast to FIG. 18A, the vanes 002 in this illustration is in the normal position or highest propeller pitch.

Figure 17A:
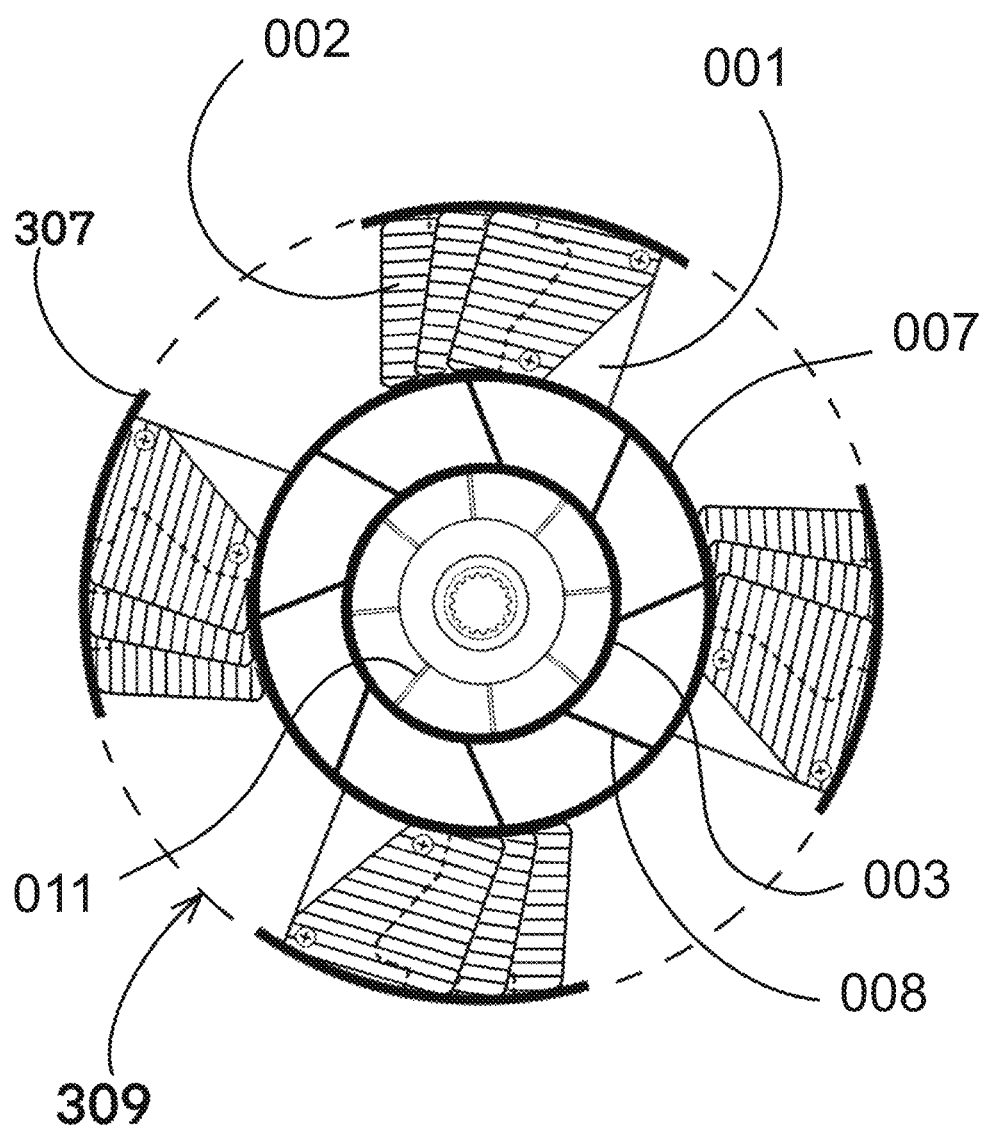
FIG. 17A is the rear view or output end of FIG. 17.

FIG. 17A shows the rear view or output side of the hybrid propulsor. It illustrates how the shape of the propulsor parts follows a perfect circle. There are 12 propeller blades that can be seen in this illustration. Each having a fixed blade 001 and a corresponding adjustable vane 002. It is shown that shroud 307 owing to its unique shape and design perfectly traces the line of rotation 309 of the propulsor This will prevent turbulence and drag while the propulsor is rotating. This concentric shape of the blades and shroud is uniquely superior to the clover shape of propeller blades of prior art.

Figure 18:
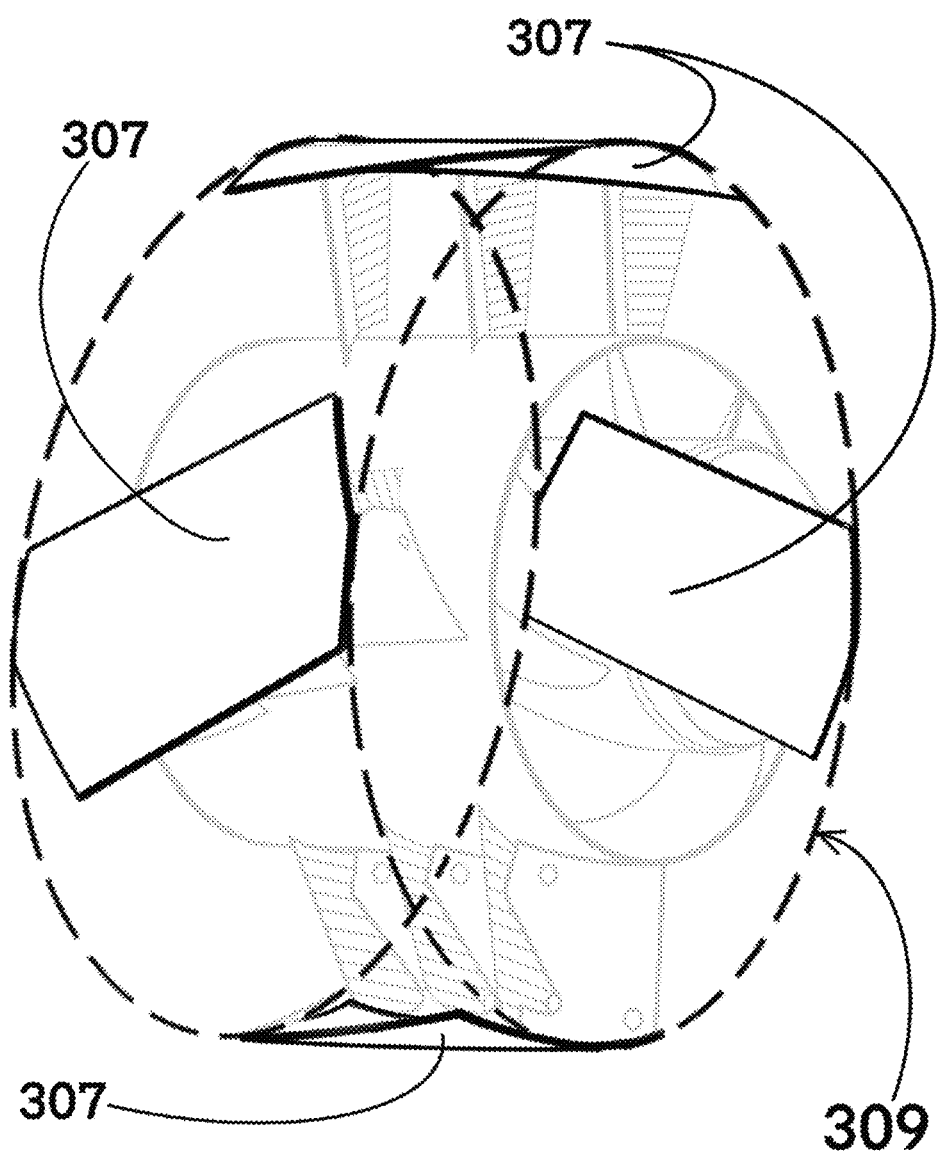
FIG. 18 illustrates a partial duct design which is shaped to work in tandem with a multiple row propeller blade array.

FIG. 18 Illustrates how the partial shroud 307 is shaped and cut out of a cylindrical duct. These uniquely shaped partial shrouds 307 are welded to the tips of the propeller blades thereby protecting the adjustable vanes inside. It is well documented in the prior art that ducted propellers are also called shrouded propellers and there is an advantage when propellers are shrouded. As the partial shroud 307 is welded to the array of blades 001, it ties the blades together and thereby making the construction stronger. As cavitation usually develop at the propeller tips, this embodiment takes advantage of these shrouds 307 to cover the blade tips. The shrouds are designedly bent that its outer side concentrically rotates along the circumferential path 309 so as not to cause turbulence. It is further disclosed that the novel design of shaping the propeller tips to coincide with the uniquely curved shroud 307 will result in an overall excellent streamlining of the propeller. FIG. 18 further illustrates how the shroud 307 strictly follow the rotational path of a cylinder on both the axial rotation and the longitudinal lines with respect to the drive shaft. The fins and shroud cannot otherwise be fitted to the propellers of the prior art due to their clover shaped tips.

Figure 18A:
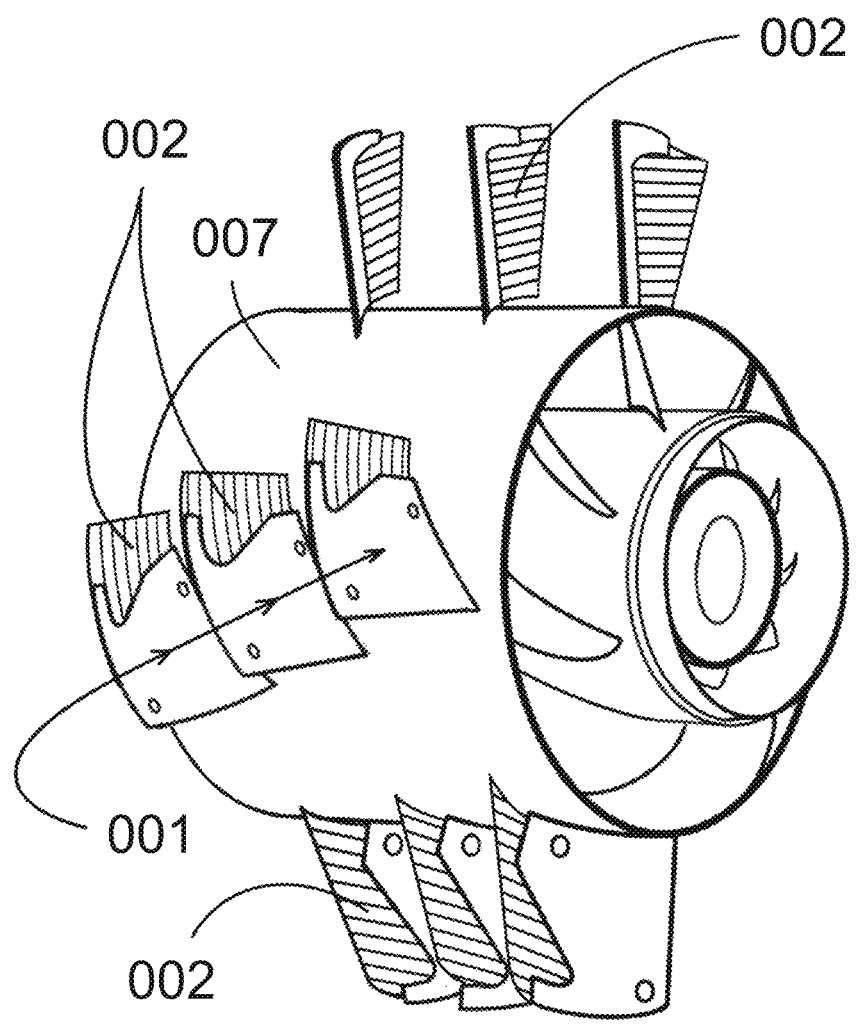
FIG. 18A is an iteration of FIG. 17 without the partial duct in order to freely expose the propeller blades.

FIG. 18A illustrates multiple rows of variable pitch propeller blades 001 that are attached in an array format to the outside of the water jet housing. Like the arrangement of rotary vanes in an aircraft jet engine, the vanes 002 are arranged in rows along a common axis. The common axis in this case is the water jet duct 007. Rather than using the usual few and bigger blades as typical in the prior art, a greater number of smaller blades 001 is employed in this embodiment. Greater number of vanes amount to stronger pumping action. The fixed blades in this embodiment is uniquely curved to support the shape of the adjustable vane when they are bending. In contrast to FIG. 17, the vanes 002 in this illustration are in the bent position or lowest propeller pitch. During a "hole shot" or High RPM combined with slow boat speed, or accelerating from low to high speed, or at steady cruising speeds with heavy load, water pressure at the rear surface will be greater than at the front surface of the propeller blades. Under these conditions, these flat springs will be pushed by the higher water pressure at the rear surface and thus bent towards the front surface thus altering the propeller pitch from high to low pitch. This automatic adjustment will greatly improve hole shot performance and cruising speed of the watercraft.

Figure 18B:
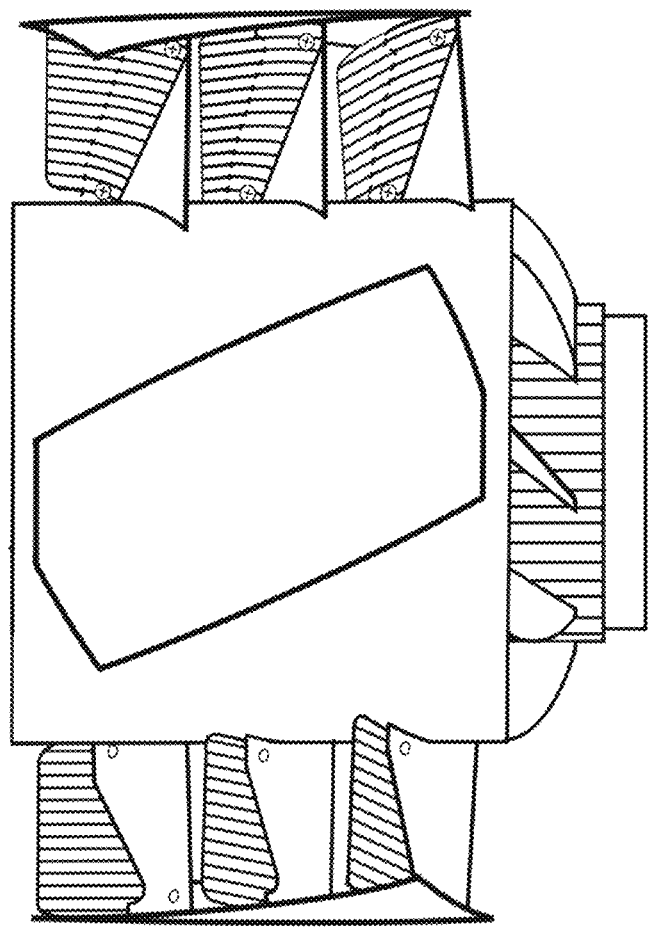
FIG. 18B is the side view of FIG. 17.

FIG. 18B shows a side view of the embodiment shown in FIG. 17.

Figure 19:
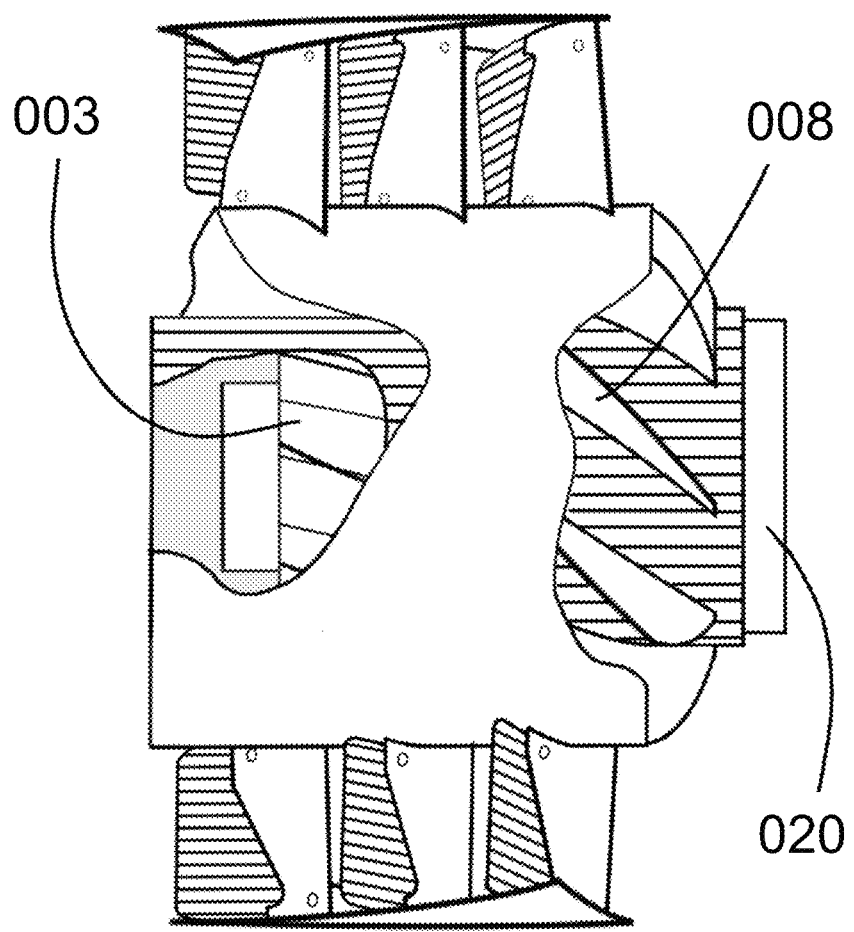
FIG. 19 is the cross section view of FIG. 18B exposing the water jet spiral vanes and the turbine blades inside the hub.

FIG. 19 shows a cross sectional view of FIG. 18B exposing the turbine inside.

Figure 20:
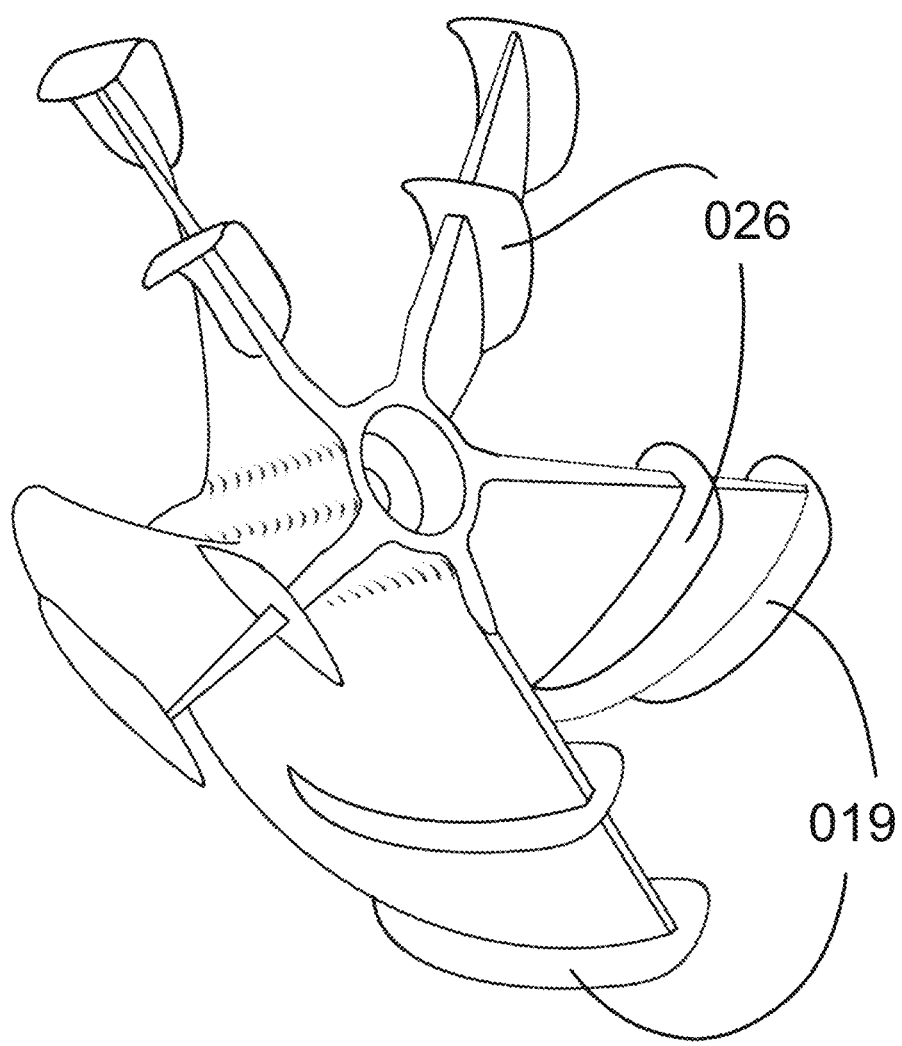
FIG. 20 illustrates a simple application of fins attached to propeller blade tips and along the length of the blade.

FIG. 20 Illustrates a simple application of the fins on a conventional shape propeller of the prior art. By attaching fins 019 at the tips of the blades, cavitation is reduced. It is further disclosed that by attaching intermediate fins 026 along the length of the blade will reduce ventilation occurring when the propeller is partially out of the water during sudden acceleration and abrupt turning.

Figure 20A:
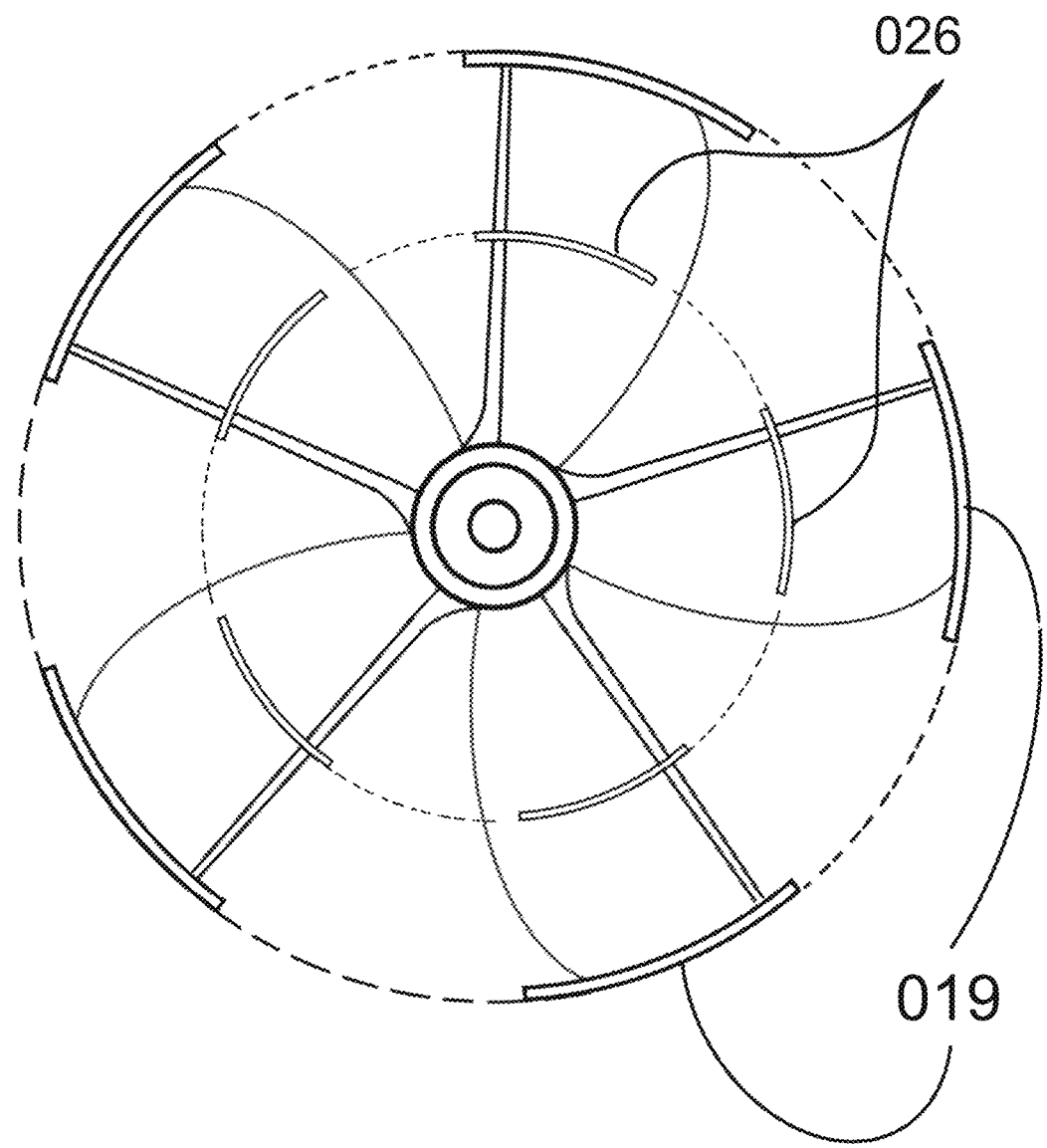
FIG. 20A is the rear view or output end of FIG. 20

FIG. 20A is a rear view of FIG. 20 revealing the perfect streamlining of the of the fins along the radial lines of the propeller.

Figure 21:
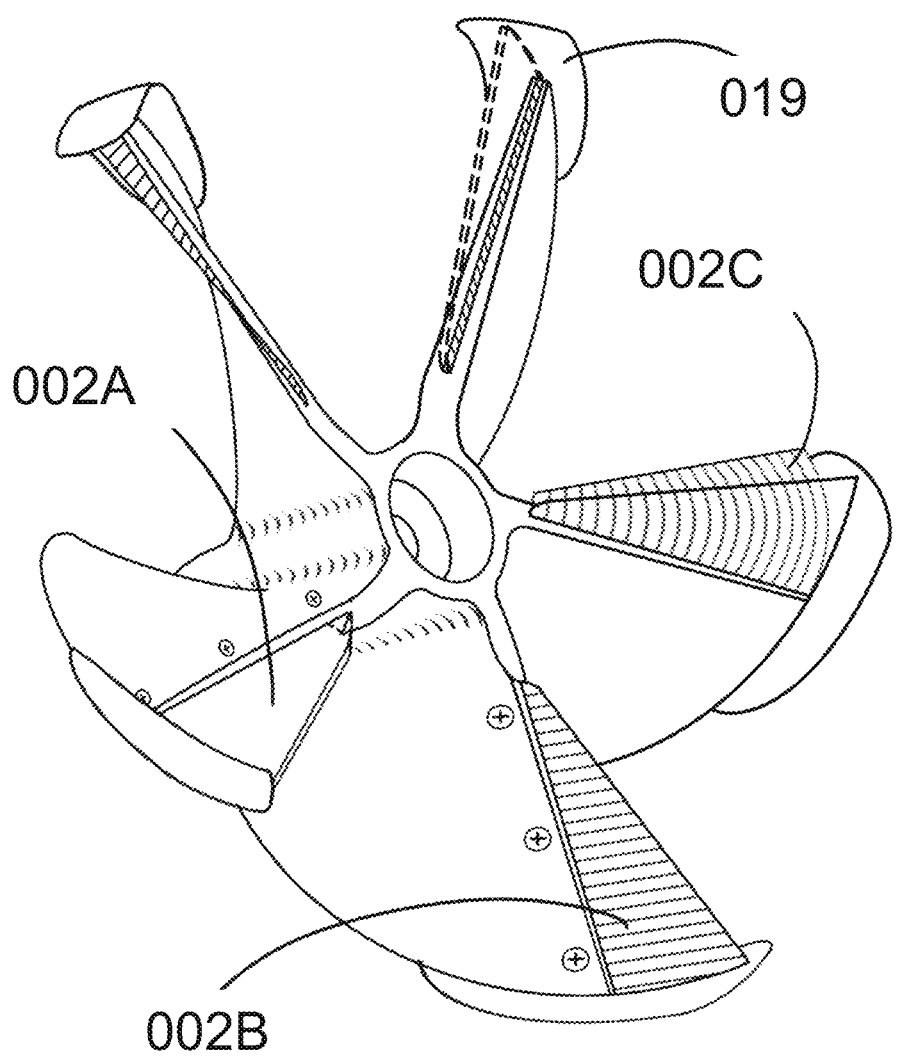
FIG. 21 illustrates a high speed CNC propeller with adjustable vanes fitted on the trailing edge of the blades and fins attached to the tips.

FIG. 21 is a simplified embodiment including only the adjustable vane 002. FIG. 21 illustrates various methods of fitting fins to a propeller. FIG. 21 shows an adjustable vane 002A following the attachment method shown in FIG. 9D. Additionally, FIG. 21 shows an adjustable vane 002B follows the attachment method of FIG. 9F. When fitted with a self-adjusting vane, this otherwise conventional propeller found in the prior art will automatically adjust to different load conditions. When the water pressure is higher than the spring resistance of the vane, it causes the vane to vary its angle of attack or pitch as shown by example of the bent vane 002C. When the boat is making a "hole shot" or accelerating from full stop to plane speed, the water pressure on the rear surface of the propeller becomes greater than the spring tension. When the boat has reached its optimal cruising speed or when the motor is at its optimal RPM, the water pressure behind the propeller blades again becomes lower than the spring tension. In this condition, the spring resistance will cause the vanes to automatically adjust from lowest pitch to its highest pitch or angle of attack. Fins protect the adjustable vanes aside from minimizing cavitation.

Figure 22:
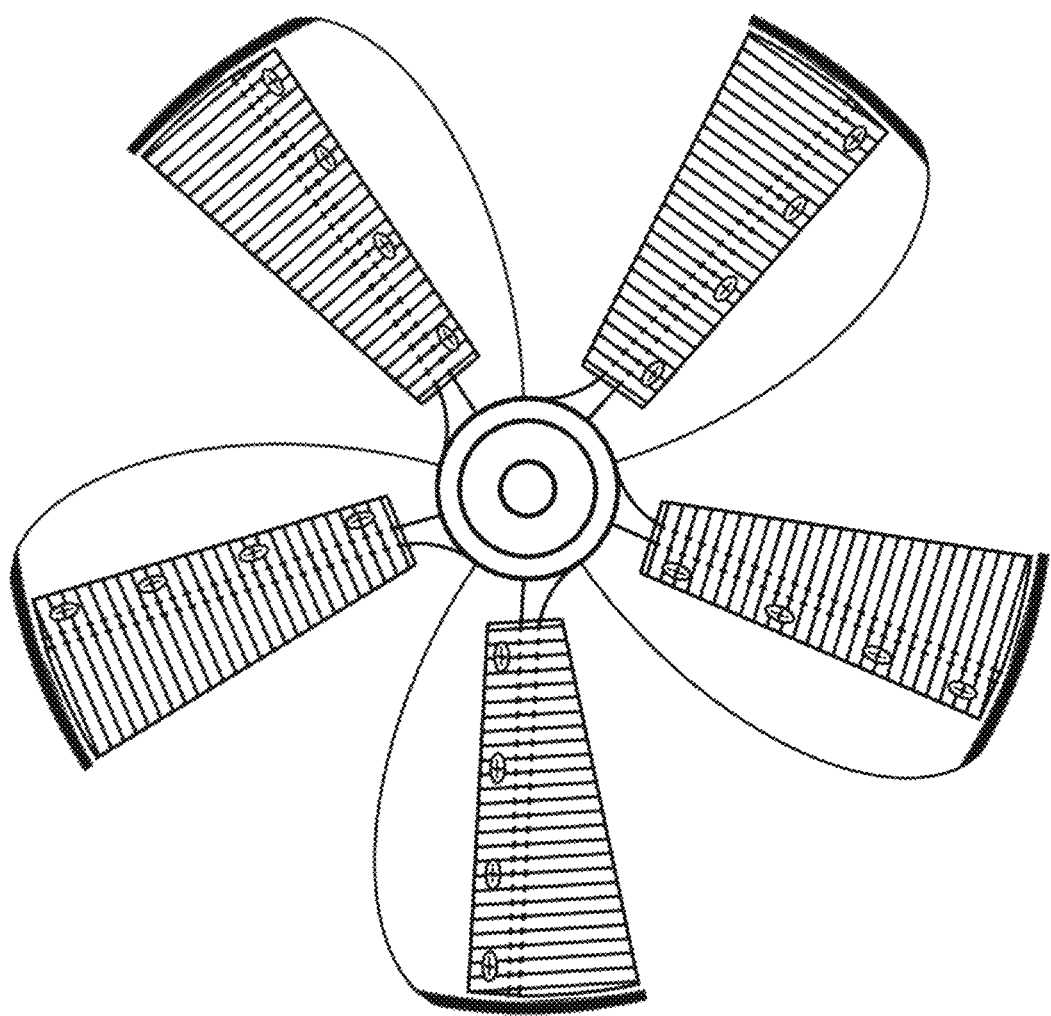
FIG. 22 is the rear view or output side of FIG. 21.

FIG. 22 is an example of attaching vanes and fins to a CNC racing propeller.

Figure 23:
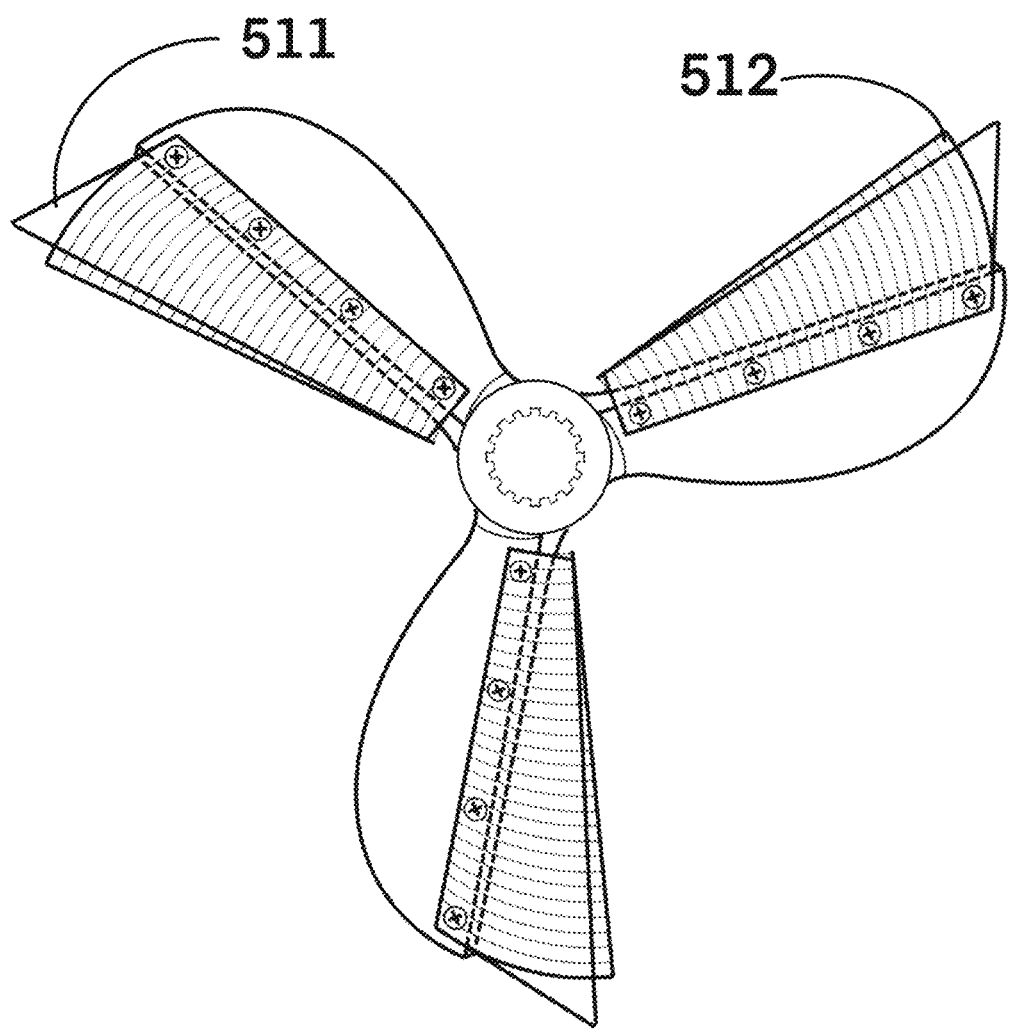
FIG. 23 is a simple application of adjustable vanes made of flat spring. The flat springs are attached to the trailing edge of a fixed pitch propeller.

FIG. 23 is an example of attaching vanes and fins to a inboard propeller. FIG. 23 also illustrates the normal resting condition 511 of the vane which is the highest pitch. And it also shows the bent condition 512 which is the vane's lowest pitch.

Figure 24:
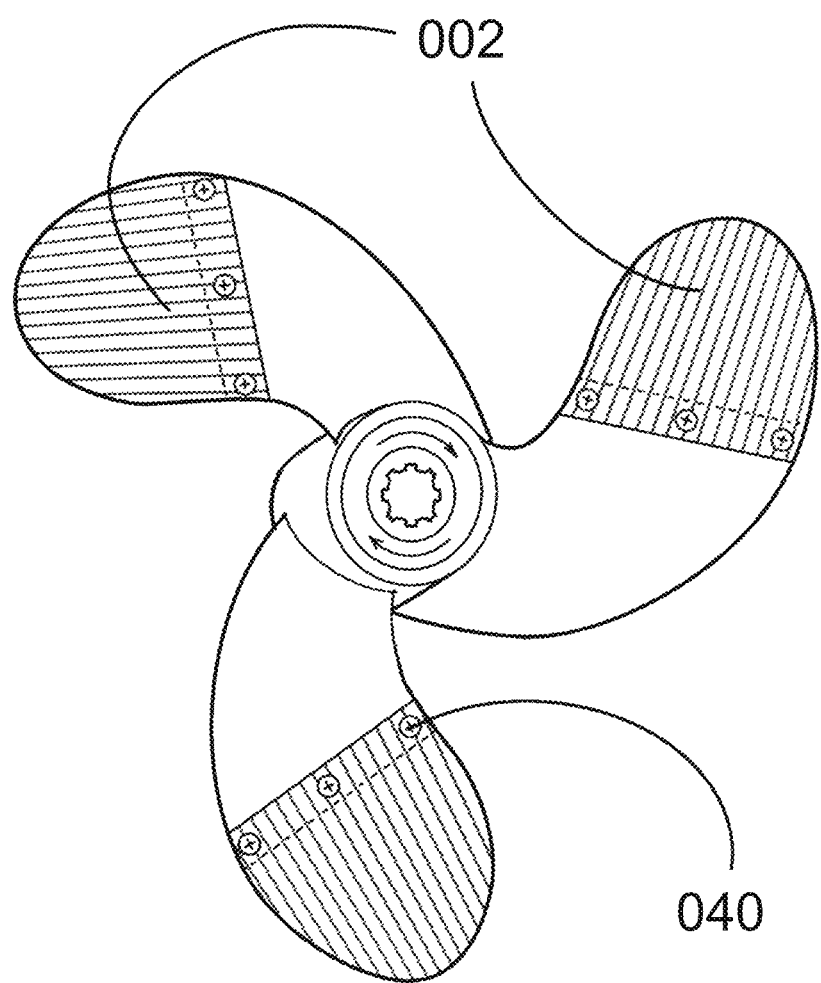
FIG. 24 is an alternative embodiment for a low speed low pitch propeller.

FIG. 24 is an sample of attaching vanes to a low pitch propeller. The vanes 002 are attached by fastener 040, in this case comprised of screws to the trailing edge of the propeller.

Figure 25:
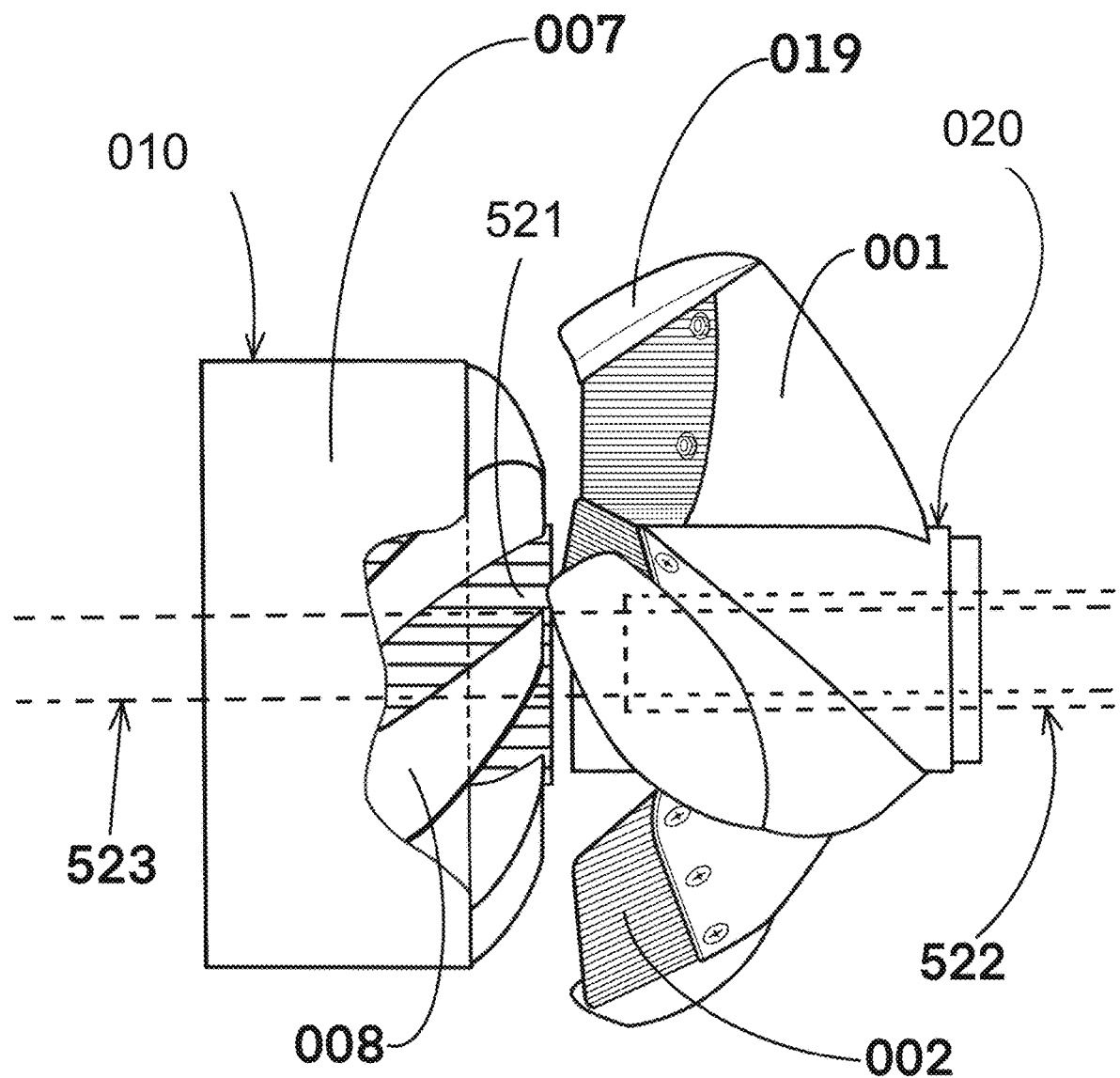
FIG. 25 is an alternate embodiment of a hybrid propulsor including counter-rotating driveshafts.

FIG. 25 shows an embodiment of a hybrid propulsor mainly for use with watercraft having counter-rotating drive shafts or CRP system. This embodiment includes two driveshafts, first driveshaft 522 rotating in one direction, for example clockwise, and second driveshaft 523 rotating in the opposite direction, counterclockwise in this example. In this illustration, the forward propulsive element is a self-adjusting propeller comprising of a hub 020, a fixed blade 001, self-adjustable vanes 002 and fins 019 attached to the tips of the blade. The aft propulsive element is a water jet 010 comprising of a second hub 521, a plurality of impeller blades 008 and a rotating duct 007 concentrically connected to and rotates with the blades. It is recognized in the prior art that the forward and the aft propellers of the CRP system interact with each other and generate a much more complicated water flow field around the system thus sacrificing efficiency. In this novel embodiment, with the addition of the water jet 010 positioned closely behind the trailing edge of the forward propeller, it significantly improves the propulsion efficiency by recovering a part of the energy loss due to the rotational flow and, hence, could significantly reduce the fuel consumption.

Figure 25A:
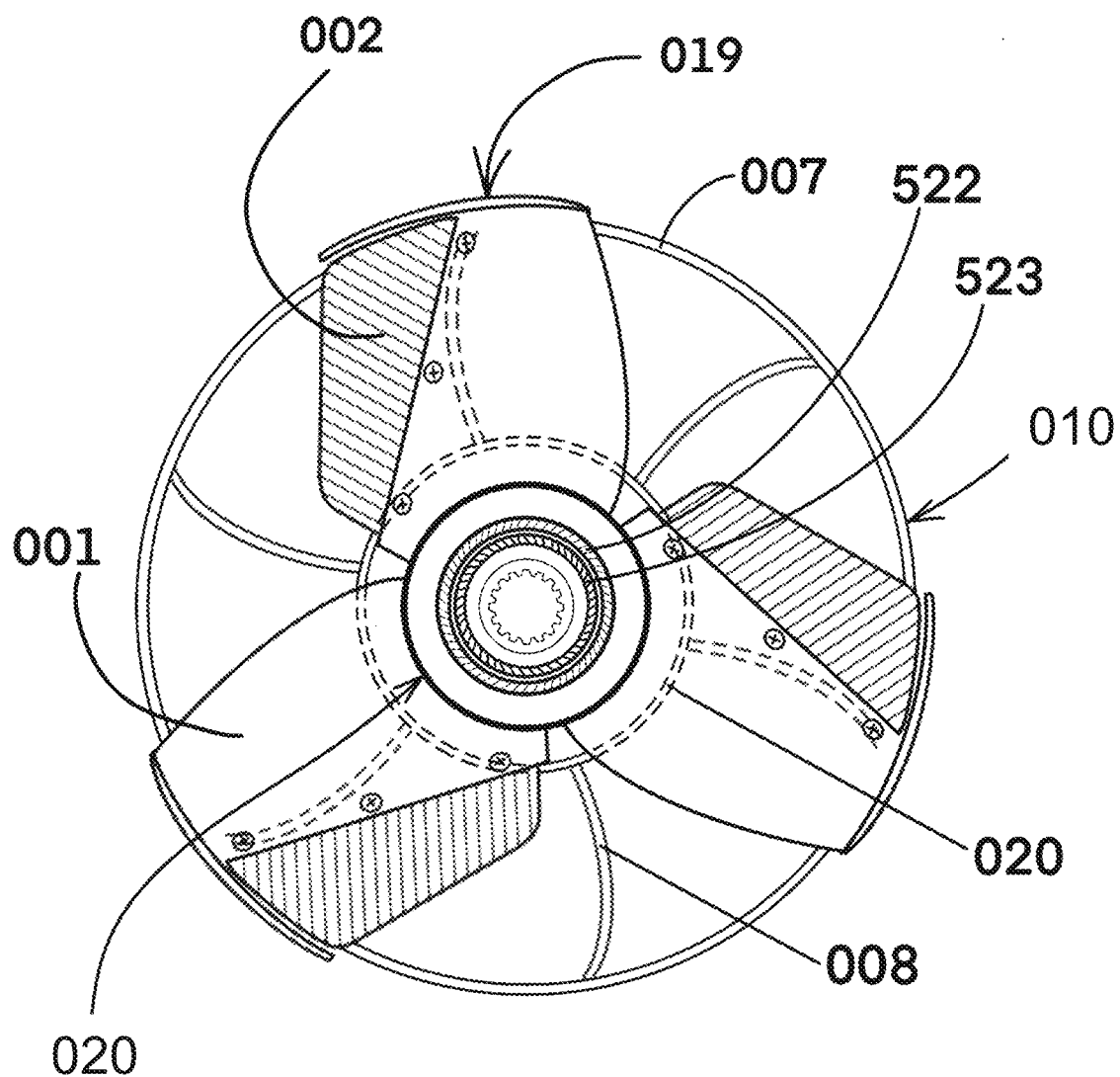
FIG. 25A is an water inlet side view of the embodiment shown in FIG. 25.

FIG. 25A is a water inlet side view of FIG. 25. This figure shows the cross section of first drive shaft 522 and second driveshaft 523. These two driveshafts are able to rotate in two separate directions, one clockwise and one counterclockwise. This illustration further shows how the fins 019 of the forward propeller overlap concentrically with the rotating duct 007 of the aft impeller. Because of this concentric arrangement, the rotational flow produced by the forward propeller is not lost since it is directed by the fins 019 straight into the duct 007 of the aft impeller. The impeller blades 008 consequently captures the rotational flow thus increasing the motive thrust of the CRP system.

While the embodiments disclosed in this patent specification are the preferred embodiments known to the inventor at the time of filing the application, these embodiments are not intended to limit the invention beyond the scope of limitations the claims. Many other embodiments, materials, constructions and methods are known in the art and may fall within the scope of the attached claims while not being discussed in this specification.

The invention claimed is:

1. A hybrid propulsor for providing propulsion for a watercraft driven by an engine with a driveshaft and an exhaust, the hybrid propulsor comprising:

A hub connecting the propulsor to the driveshaft of the engine;

An exhaust turbine connected to the exhaust of the engine, the exhaust turbine concentrically surrounding the hub and comprising an exhaust turbine housing containing a plurality of exhaust turbine blades disposed axially between the hub and the exhaust turbine housing, said exhaust turbine blades providing motive force when engine exhaust passes over them; and A plurality of propeller blades attached to the exterior of the exhaust turbine housing and disposed axially around the exhaust turbine housing, each propeller blade comprising a fixed forward portion connected to an adjustable vane rear portion by a fastener and the vane adjustable by a spring, said propeller blades providing motive force when rotated by the engine.

2. The hybrid propulsor of claim 1 where a water jet concentrically surrounds the exhaust turbine, the water jet comprising a water jet duct containing a plurality of impeller blades disposed axially between the exhaust turbine housing and the water jet duct, said water jet providing motive force when water is forced through the water jet and over the impeller blades; and Where the plurality of propeller blades are attached to the exterior of the water jet duct.

3. The hybrid propulsor of claim 1 where the fastener is screws, clips, rivets or hinges.

4. The hybrid propulsor of claim 1 where the spring is a flat spring or a coil spring.

5. The hybrid propulsor of claim 1 where the adjustable vane is comprised of a flat spring.

6. The hybrid propulsor of claim 1 where a rotating duct is attached to the outer tip of the propeller blades and circularly encloses the propeller blades.

7. The hybrid propulsor of claim 1 where the propeller blade includes a fin at the end of the blade.

8. The hybrid propulsor of claim 7 where the propeller blade includes an intermediate fin disposed between the water jet duct and the end of the blade and a fin at the end of the blade.

9. The hybrid propulsor of claim 1 where multiple propeller blades are arranged in an array and the ends of the blades are covered by a partial shroud.

10. A hybrid propulsor for providing propulsion for a watercraft driven by an engine with a driveshaft and an exhaust, the hybrid propulsor comprising:

A hub connecting the propulsor to the driveshaft of the engine;

A water jet concentrically surrounding the hub, the water jet further comprising:

A water jet duct containing a plurality of impeller blades disposed axially between the hub and the water jet duct, said water jet providing motive force when water is forced through the water jet and over the impeller blades; and A plurality of propeller blades attached to the exterior of the water jet duct and disposed axially around the water jet duct, each propeller blade comprising a fixed forward portion connected to an adjustable vane rear portion by a fastener and the vane adjustable by a spring, said propeller blades providing motive force when rotated by the engine and wherein the adjustable vane rear portion of the propeller blade adjusts the pitch of the propeller blade.

11. The hybrid propulsor of claim 10 where an exhaust turbine is connected to the exhaust of the engine, the exhaust turbine concentrically surrounding the hub and comprising an exhaust turbine housing containing a plurality of exhaust turbine blades disposed axially between the hub and the exhaust turbine housing, said exhaust turbine blades providing motive force when engine exhaust passes over them, Where the plurality of impeller blades are attached to the exterior of the exhaust turbine housing.

12. The hybrid propulsor of claim 10 where the fastener is screws, clips, rivets or hinges.

13. The hybrid propulsor of claim 10 where the spring is a flat spring or coil spring.

14. The hybrid propulsor of claim 10 where the adjustable vane is comprised of a flat spring.

15. The hybrid propulsor of claim 10 where a rotating duct is attached to the outer tip of the propeller blades and circularly encloses the propeller blades.

16. The hybrid propulsor of claim 10 where the propeller blade includes a fin at the end of the blade.

17. The hybrid propulsor of claim 16 where the propeller blade includes an intermediate fin disposed between the water jet duct and the end of the blade and a fin at the end of the blade.

18. The hybrid propulsor of claim 10 where multiple propeller blades are arranged in an array and the ends of the blades are covered by a partial shroud.

* * * * *